United States Patent [19]
Akai et al.

[11] Patent Number: 5,434,998
[45] Date of Patent: Jul. 18, 1995

[54] DUAL COMPUTER SYSTEM

[75] Inventors: Hajime Akai; Isao Domoto; Eiji Nakamoto; Yoshitugu Morioka; Shunsuke Hayashi, all of Tokyo, Japan

[73] Assignee: Yokogawa Electric Corporation, Tokyo, Japan

[21] Appl. No.: 33,661

[22] Filed: Mar. 16, 1993

Related U.S. Application Data

[63] Continuation-in-part of Ser. No. 850,156, Mar. 13, 1992, abandoned, which is a continuation of Ser. No. 317,291, Feb. 28, 1989, abandoned.

[30] Foreign Application Priority Data

| Apr. 13, 1988 | [JP] | Japan | 63-90752 |
| Apr. 19, 1988 | [JP] | Japan | 63-96171 |
| Apr. 19, 1988 | [JP] | Japan | 63-96172 |
| Apr. 27, 1988 | [JP] | Japan | 63-105064 |
| May 6, 1988 | [JP] | Japan | 63-109955 |

[51] Int. Cl.$^6$ .................................... G06F 11/00
[52] U.S. Cl. .................................... 395/575
[58] Field of Search ............. 395/575; 364/131, 229.4, 364/230.5

[56] References Cited

U.S. PATENT DOCUMENTS 5,020,024 5/1991 Williams .............................. 395/575
5,036,455 7/1991 Arwood .............................. 395/575

Primary Examiner—Vincent P. Canney
Attorney, Agent, or Firm—Moonray Kojima

[57] ABSTRACT

A dual computer system comprising a pair of processor units, and a dual control unit for controlling which of the two processor units are to be kept operating or on standby in case of failure of the operated unit; wherein the dual control unit controls which processor unit is to be operated through monitoring of the operating states of the two processor units, and comprising two independent interruption devices for indicating the switching of the two processor units through interruption. The system is effective in improving the continuity of the control at the time of switching.

8 Claims, 22 Drawing Sheets

Fig.12
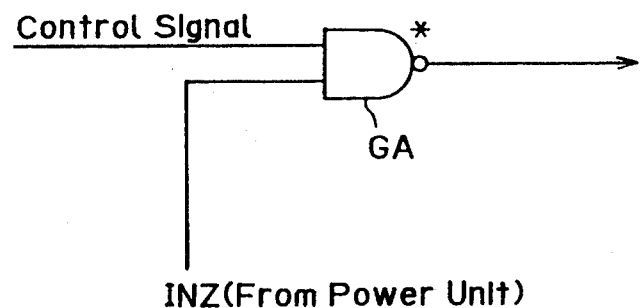
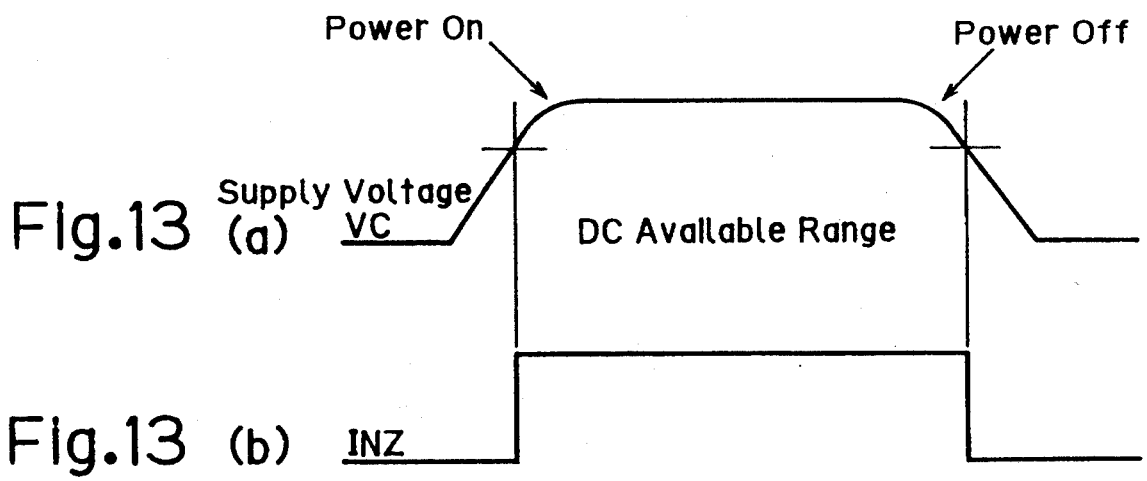
Fig.13 (a)
Fig.13 (b)

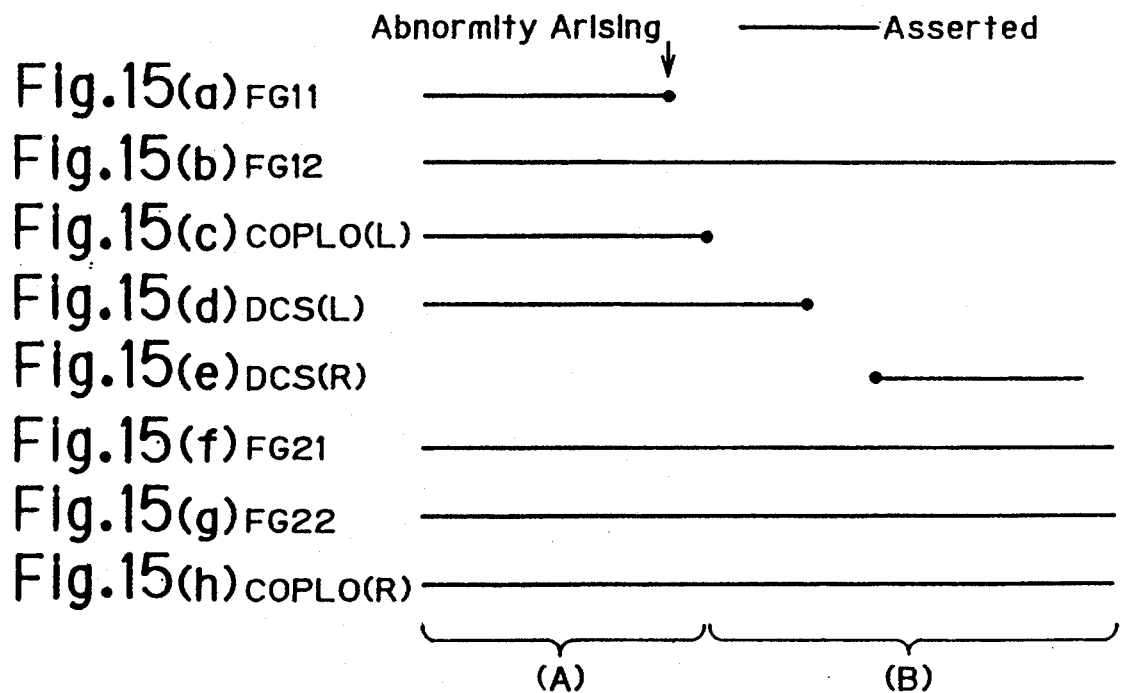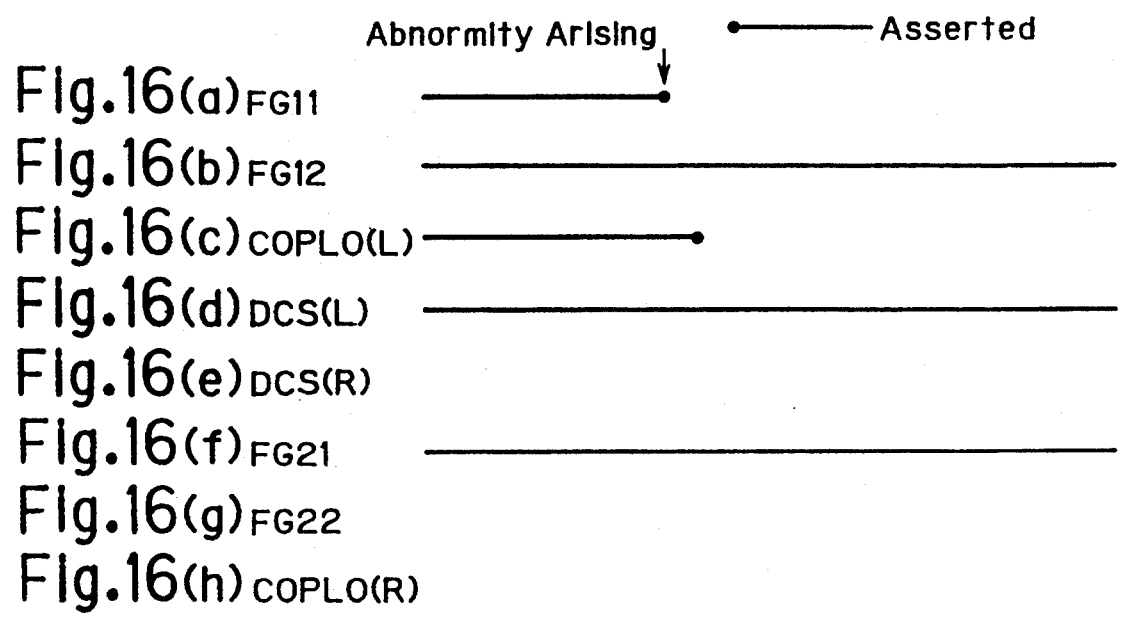

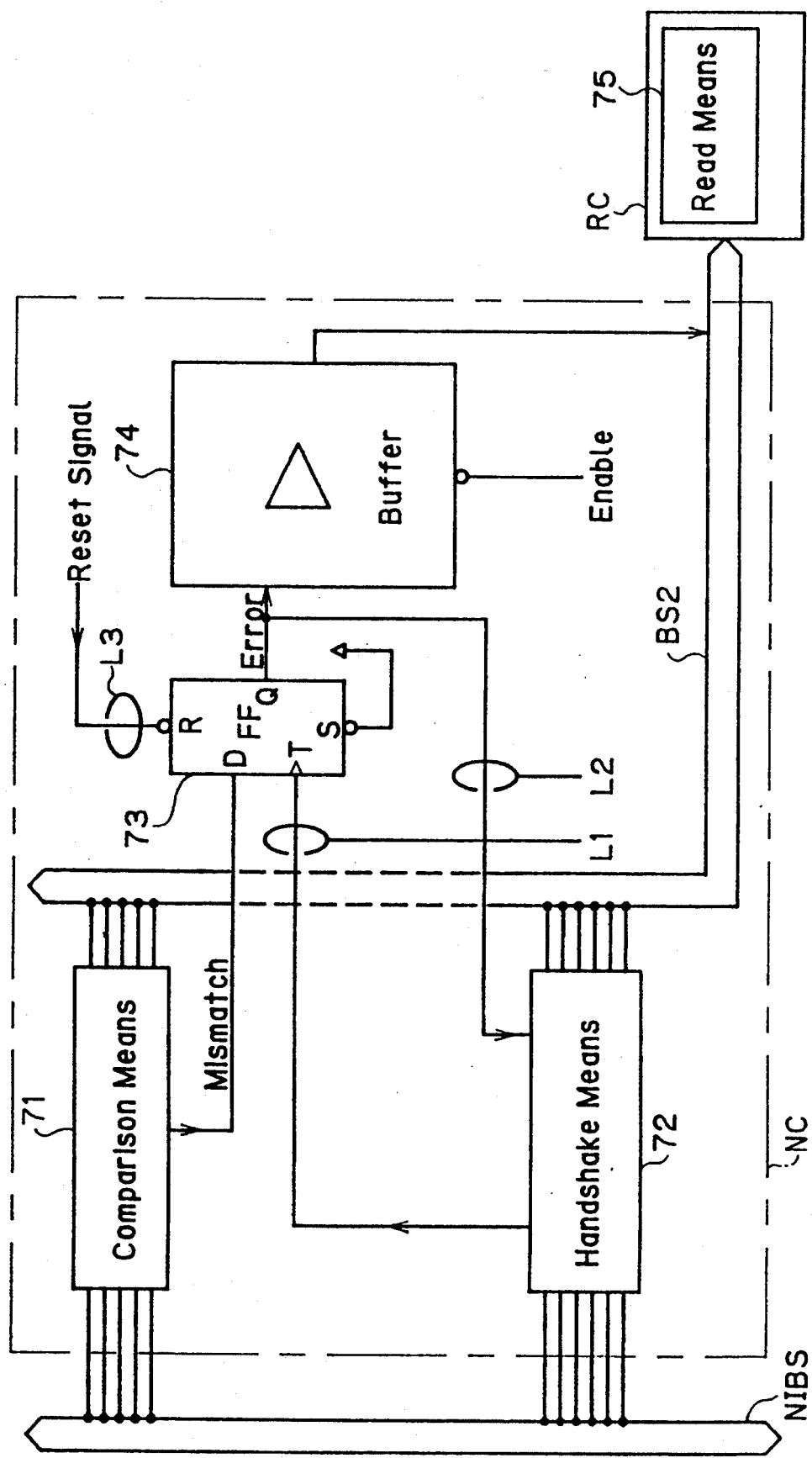

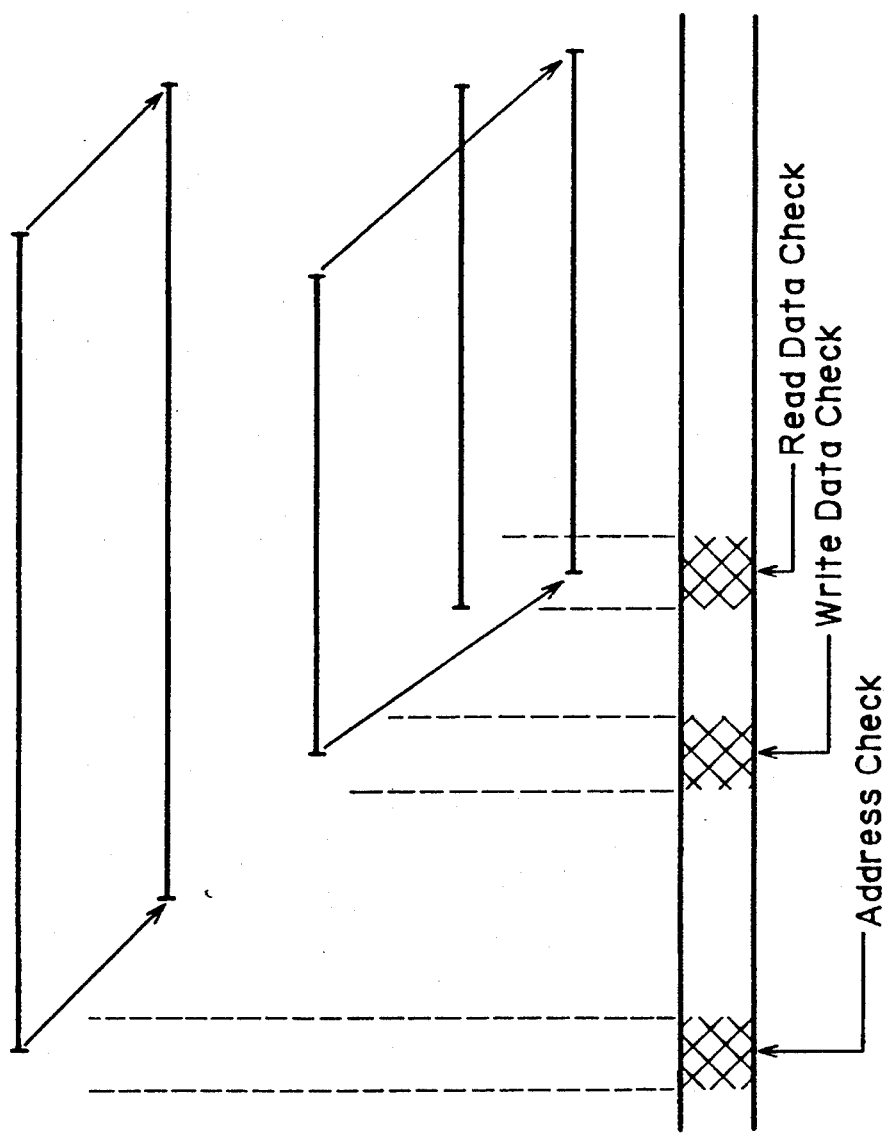

DUAL COMPUTER SYSTEM

This is a CIP of Ser. No. 07/850,156 (Mar. 13, 1992) which is a continuation of Ser. No. 07/317,291 (Feb. 28, 1989), both of which are now abandoned.

BACKGROUND OF THE INVENTION

1. Field of Invention

This invention relates to a dual computer system using two processor units to improve continuity of control at the time of dual switching; and, more particularly, to a dual computer system comprising two processor units, of which one is an operated state, while the other is in a standby state for use in the event of failure of the operated unit, and a dual control unit for controlling and monitoring the operation of the two processor units to actuate one unit while keeping the other unit in the standby state.

2. Description of the Prior Art

A dual system has been used in the prior art to enhance reliability of a control system. Such a dual system, which uses two processor units or computers is disclosed, for example, in U.S. Pat. Nos. 3,503,048; 3,562,716 and 3,864,670.

FIG. 1 depicts such a prior art dual control system which is disclosed in U.S. Pat. No. 3,864,670. The system comprises two processor units or computers PC1, PC2; a dual control unit DXC for monitoring operation of the processor units; and a plurality of input/output units $IO_1 \ldots IO_n$ connected to the two processor units through a bus and switch.

Dual control unit DXC monitors operation of processor units PC1, PC2; actuates either one (e.g. PC1) of the processor units PC1,PC2 while keeping the other (e.g. PC2) on standby; and operates the switch to assign actual operation to unit PC2 when processor unit PC1, which in an operated state fails or is demounted from the system, e.g. for for maintenance work or the like.

Generally, the dual control unit DXC uses a reset signal of the system for timing to switch the operated state to the standby state. If such system is once reset, then a manipulating time for initialization is required before return. Thus, such a computer control will be suspended for several hundred milliseconds to several seconds.

SUMMARY OF THE INVENTION

An object of the invention is to provide a dual computer system wherein the switching time will be shortened and a suspension of the control can be avoided by utilizing a hardware interruption of the processor at the time of dual switching, i.e. at the time of control transfer.

Another object is to provide a dual computer system having means for equalizing the contents of memories in two processor units so as to smooth control transfer from one processor unit to the other processor unit in a dual control unit, wherein continuity of control is enhanced when the control transfer from one processor unit to the other is carried out and wherein the content of inhibited access to equalizing means is protected thereby enhancing the reliability.

A further object is to provide a system wherein a dual control unit and one of the processor units is demounted from the system, and the one processor is ready for operation.

BRIEF DESCRIPTION OF THE DRAWINGS

FIG. 12 is a block diagram depicting one example of the bus function stop means of FIG. 11.

FIG. 13, lines (a) and (b), is an explanatory drawing of a signal generated by the supply means of FIG. 11.

FIG. 15, lines (a)–(h); and FIG. 16, lines (a)–(h) are time charts for illustrating operation of the system of FIG. 14.

FIG. 23 is a block diagram depicting the internal construction of the nest common unit of FIG. 22.

FIG. 24, lines (a)–(f), is a time chart depicting one example of the operation of the nest common unit.

DETAILED DESCRIPTION OF THE PREFERRED EMBODIMENTS

Figure 1:
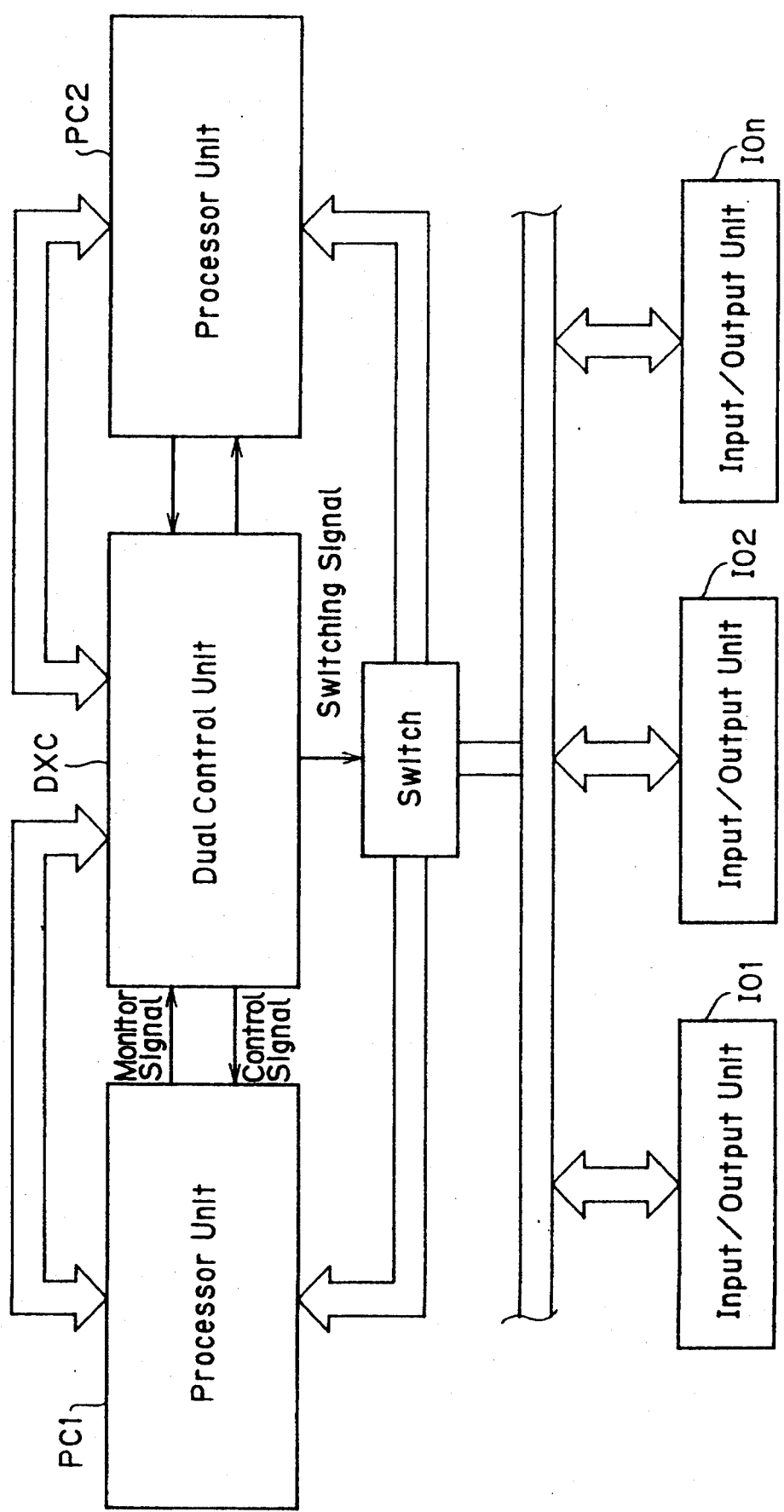
FIG. 1 is a block diagram depicting a prior art dual computer system.
Figure 2:
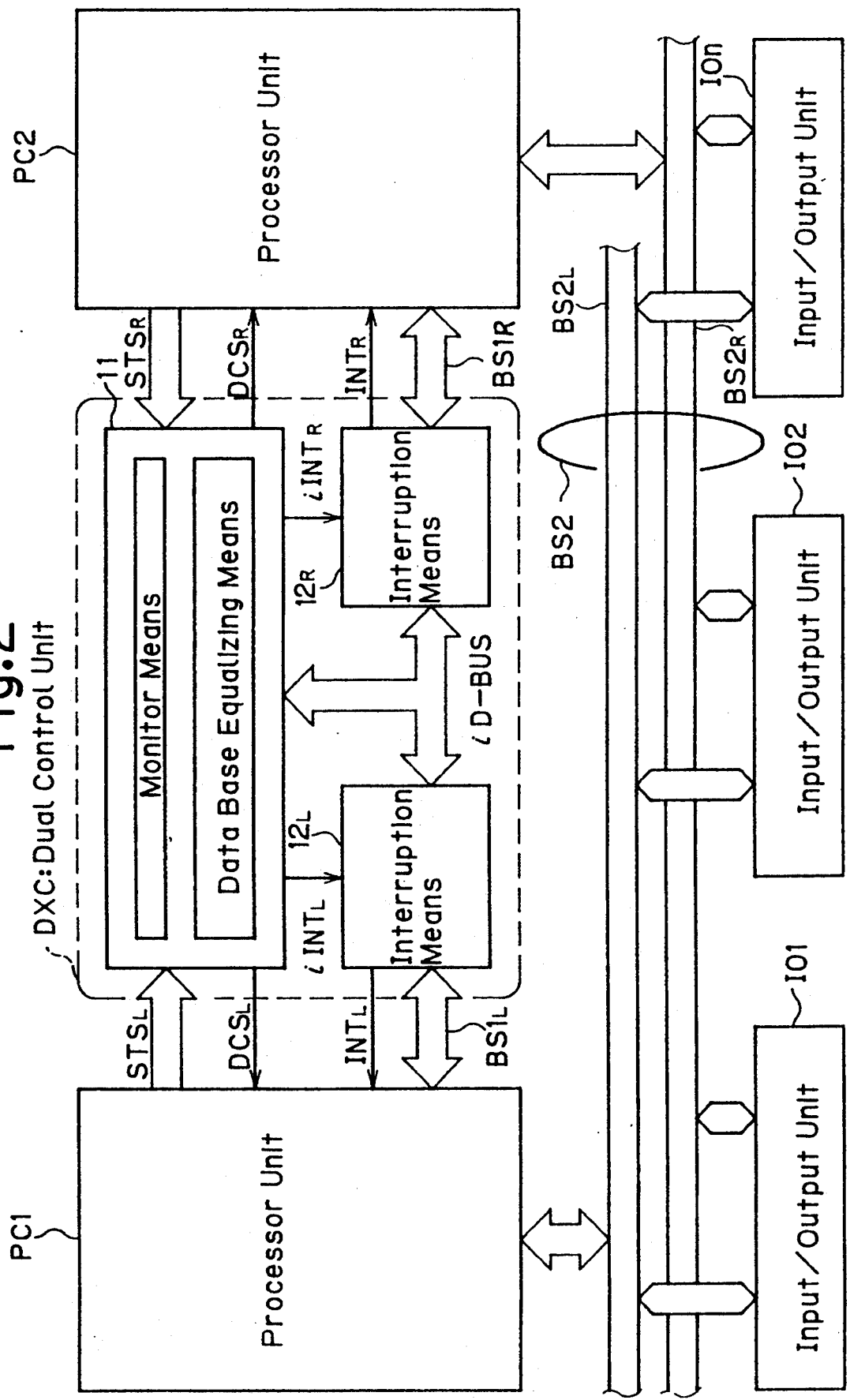
FIG. 2 is a block diagram depicting one illustrative embodiment of the invention.

Turning now to FIG. 2, the invention comprises dual processor units PC1, PC2 and a dual control unit DXC, which monitors signals STSL, STSR indicating the operating states which are generated by processor units PC1, PC2, actuates one processor unit while keeping the other processor unit on standby, and generates dual control signals DCSL, DCSR for switching assignment of the actual operation from one processor unit to the other, such as when the processor unit in the actually operated state fails or is demounted from the system such as for maintenance, etc.

First buses BS1L, BS1R connect dual control unit DXC and processor units PC1, PC2 and transmit data for equalizing data bases mutually. Input/output units $IO_1 \ldots IO_n$, which vary in type, input signals from the process, and output signals to the process, and have a communication function for transmitting signals to another system, in addition to other desired functions.

A second bus BS2 is used to transmit data between processor units PC1, PC2 and the input/output units $IO_1 \ldots IO_n$, and is connected to both. Second bus BS2 uses a standard bus so as to connect various input/output units having various functions.

Dual control unit DXC comprises a processor 11, comprising a monitor means for monitoring the signals STSL, STSR which indicate the operating states, which signals are generated by processor units PC1, PC2, and data base equalizing means for equalizing the data base for the processor unit being operated and the data base for the processor unit on standby. Two independent interruption means 12L,12R indicate switching of the main system (i.e. the operated unit) and the subsidiary system (i.e. the standby unit) to the processor units PC1, PC2 according to interrupt signals INTL, INTR, respectively. The interrupt means are constructed to include a holding means, such as a register and the like, and are provided between a first bus BS1 and an internal bus iD-BUS.

Operating of the system is as follows. If each operation is normal, processor units PC1, PC2 generate state signals STSL, STSR to dual control unit DXC. Dual control unit DXC then monitors the signals to decide which processor unit is to be actuated or to be kept on standby, and generates dual control signals DCSL, DCSR, accordingly.

To put this another way, DCS is a signal for deciding which CPU is to be provided a dual control right. If a dual control unit (DXC) is in a normal state, DXC generates DCS signals. When the right side is used as a control side, DCSR is made active, and DCSL is made inactive. On the other hand, when the left side is used as a control side, DCSL is made active and DCSR is made inactive. It should also be mentioned that if DXC were to be demounted from the system, both CPU will work so as to maintain the value of DCS which existed immediately before the DXC was demounted.

Figure 18:
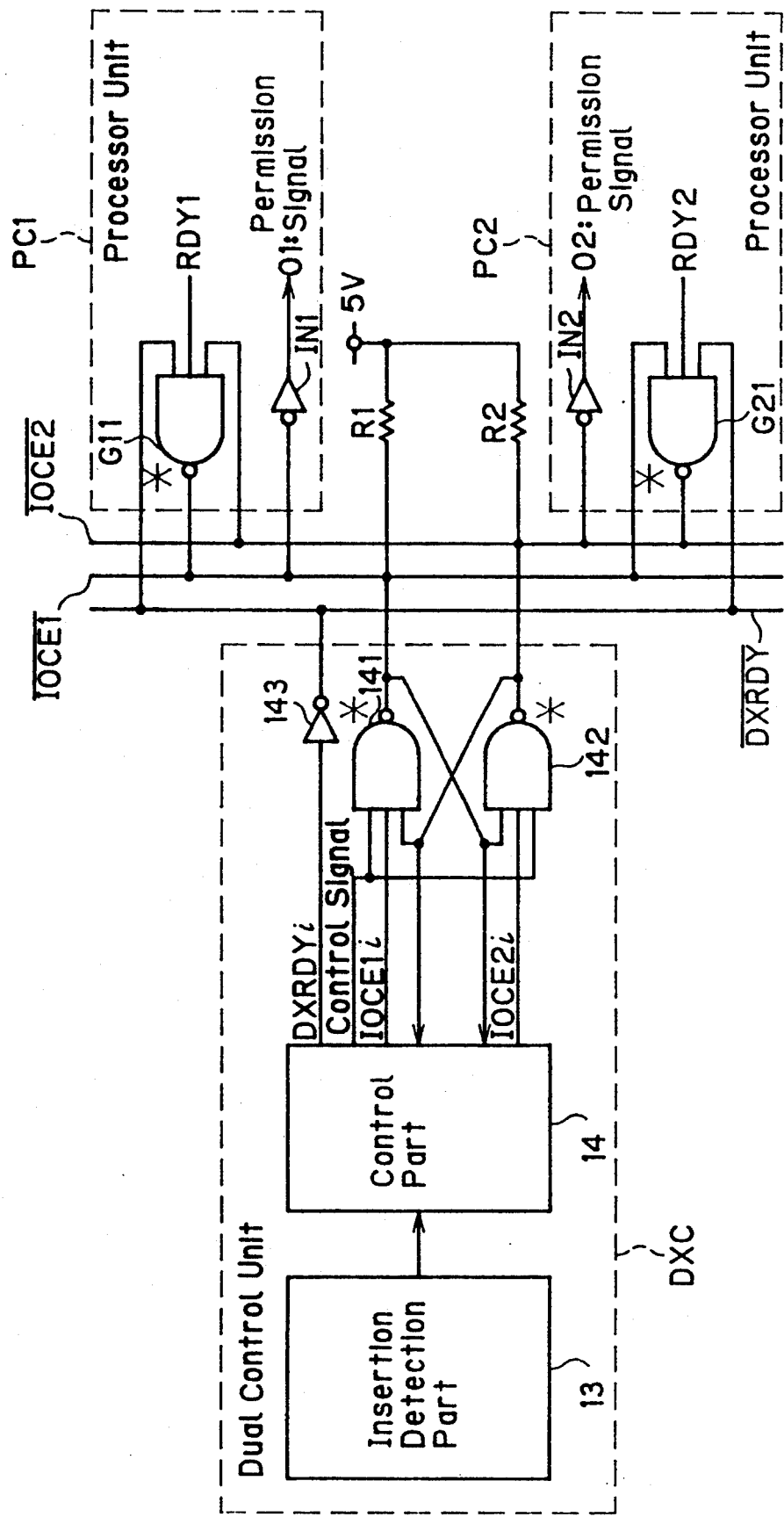
FIG. 18 is a block diagram depicting still another illustrative embodiment of the invention.

In addition to the CPU, a dual communication card is subject to the decision of DCS. For example, if $DCS_L$ is in an active state, a left communication card conducts communication control, and the right communication card is made to be on standby status. Also, it should be mentioned that IOCE signals in FIG. 18 are the same as the DCS signals just mentioned.

CTL is a signal generated from the software in the CPU. This signal is made active when its own side DCS becomes active and when the control operation starts, and thereafter maintains the active state while such DCS operates as the control side. If the CPU detects an error during self diagnosis, CTL is immediately made inactive together with the RDY signal. RDY is a signal that becomes active when the processor unit is in the normal operation state. In contrast, CTL is a signal that becomes active when the corresponding DCS enters into the control operation state. The two signals thus differ in that respect.

Necessary data base and programs are loaded in memories (not indicated in the drawings) in processor units PC1, PC2 from a host computer through the input/output unit having a communication function and the second bus BS2 at the time of initialization.

Then, in an operating state, the memory content in the processor unit in actual operation is copied successively and updated in a memory of the processor unit on standby through first bus BS1 according to operation of the equalizing means in dual control unit DXC.

Then, the processor unit in actual operation exchanges data with each input/output unit $IO_1 \ldots IO_n$ through second bus BS2, thus operating for predetermined control, etc.

In such a state, if there arises a failure on or in the processor unit in operation, then, it is detected by a monitoring means in the dual control unit DXC. If control transfer from one processor unit to another is necessary, as a result of such detection, dual control signals DCSL, DCSR are switched accordingly. An interrupt factor is outputted to internal bus iD-BUS concurrently therewith, internal interrupt signals iINTL, iINTR are, driven, and the interrupt factor is retained on interrupt means 12L, 12R. Interrupt means 12L,12R then generate interrupt signals INTL, INTR and apply the interrupt signals to processor units PC1, PC2.

Upon receipt of the interrupt signals INTL, INTR, processor units PC1, PC2 analyze the interrupt factor generated through first bus BS1, and when it is recognized as a dual switching interrupt, control transfer is carried out according to dual control signals DCSL, DCSR already generated, thus clearing the interrupt factor.

A series of the above operations can be effected within a short time of several tens to several hundreds of microseconds of signals from interrupt means 12L, 12R.

The processor unit in a standby state so far is switched to actual operation state by such control transfer. Then, such control operation is switched smoothly, since the memory content in the processor unit on standby is updated to be the same as the memory content in the other processor unit at all times.

In the FIG. 2 embodiment, second bus BS2 is duplicated. However, a bus switch may be interposed among the input/output units $IO_1 \ldots IO_n$. The interruption means, which may be available by hardware independent from processor 11, is provided in dual control unit DXC. Thus, the system is functional as a dual control system wherein the time for control transfer is shortened, and a suspension of control is avoided.

Figure 3:
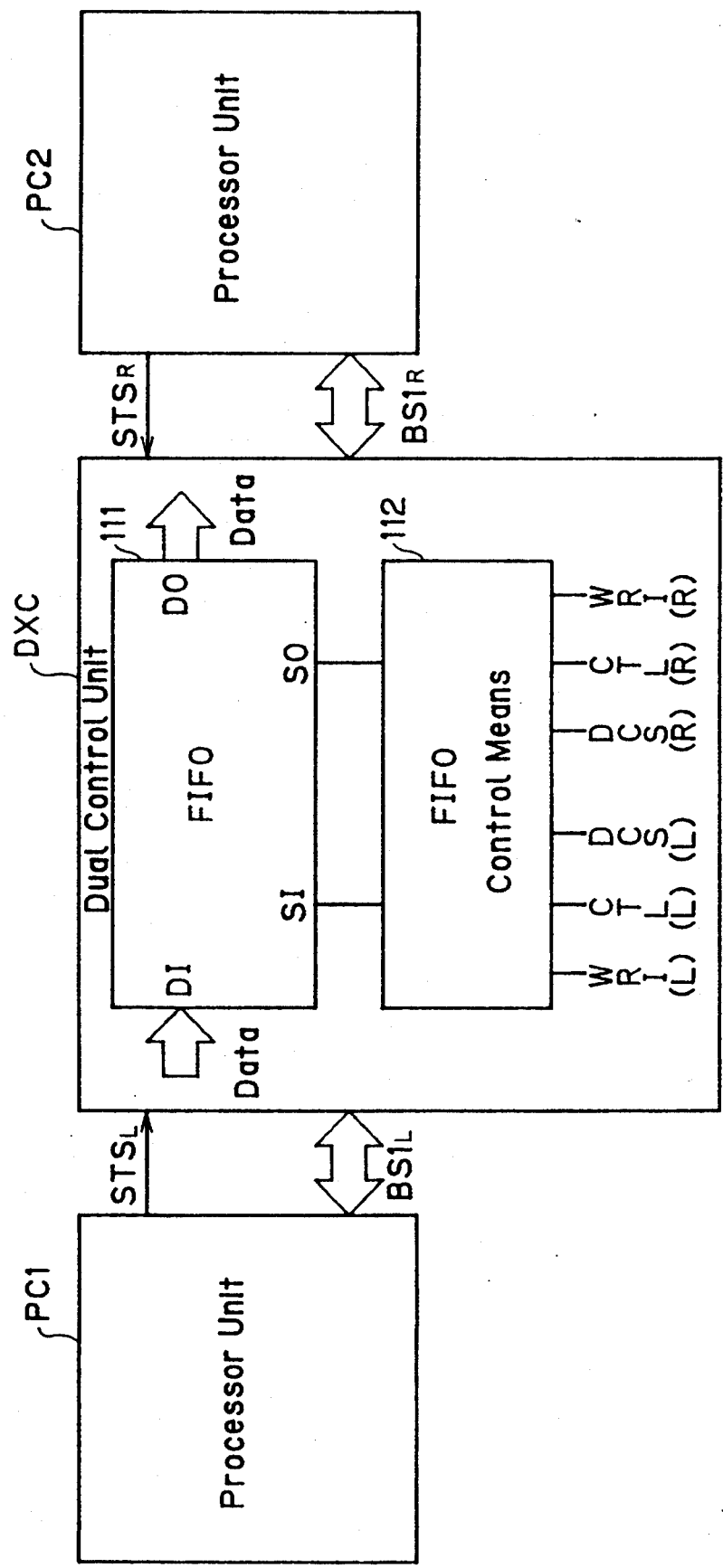
FIG. 3 is a block diagram depicting main parts of another illustrative embodiment of the invention.

FIG. 3 depicts main parts of another embodiment using a first in first out memory (called hereinafter "FIFO") as means for equalizing the memory content in the processor units PC1, PC2. In the system, data in a memory in the processor unit in operation is written in FIFO, which serves as an equalizing means, according to a write operation from the processor unit in actual operation. The content is read according to a read operation from the processor unit on standby and written in a memory in the processor unit on standby.

Meanwhile, in case FIFO is used as an equalizing means for the memory content as described above, if the memory content, once loaded in FIFO, is degraded by, for example, unintended erroneous operation of the processor unit in actual operation, then the degraded memory content is transmitted directly to the processor unit on stand-by, thereby causing both units to become erroneous. The unintended or erroneous operation causes degradation of the memory content to be transmitted from one side to the other side because the FIFO is acting as an equalizer, as above discussed. That is, the equalizer shifts signals and data from one side to the other in the equalizing process.

To remove such defect, the FIG. 3 embodiment uses means for monitoring the read/write access from the processor unit in actual operation to FIFO and the read/write access from the processor unit on standby and inhibiting forbidden access from FIFO operation to thereby protect the content and hence enhance reliability of the system.

In FIG. 3, dual control unit DXC comprises a first-in-first-out memory (FIFO) 111, and FIFO control means 112 for controlling the shift-in SI and shift-out SO of FIFO 111. FIFO control means 112 receives as inputs (1) a read/write signal WRI, (2) a control declaration signal CTL, and (3) a dual control signal DCS, which are generated by the two processor units PC1, PC2 and the dual control unit DXC (labeled L,R); and furthermore, controls shift-in SI and shift-out SO according to the logic of each signal. FIFO control means 112 inhibits access to FIFO to thereby provide protectin when necessary.

Figure 4:
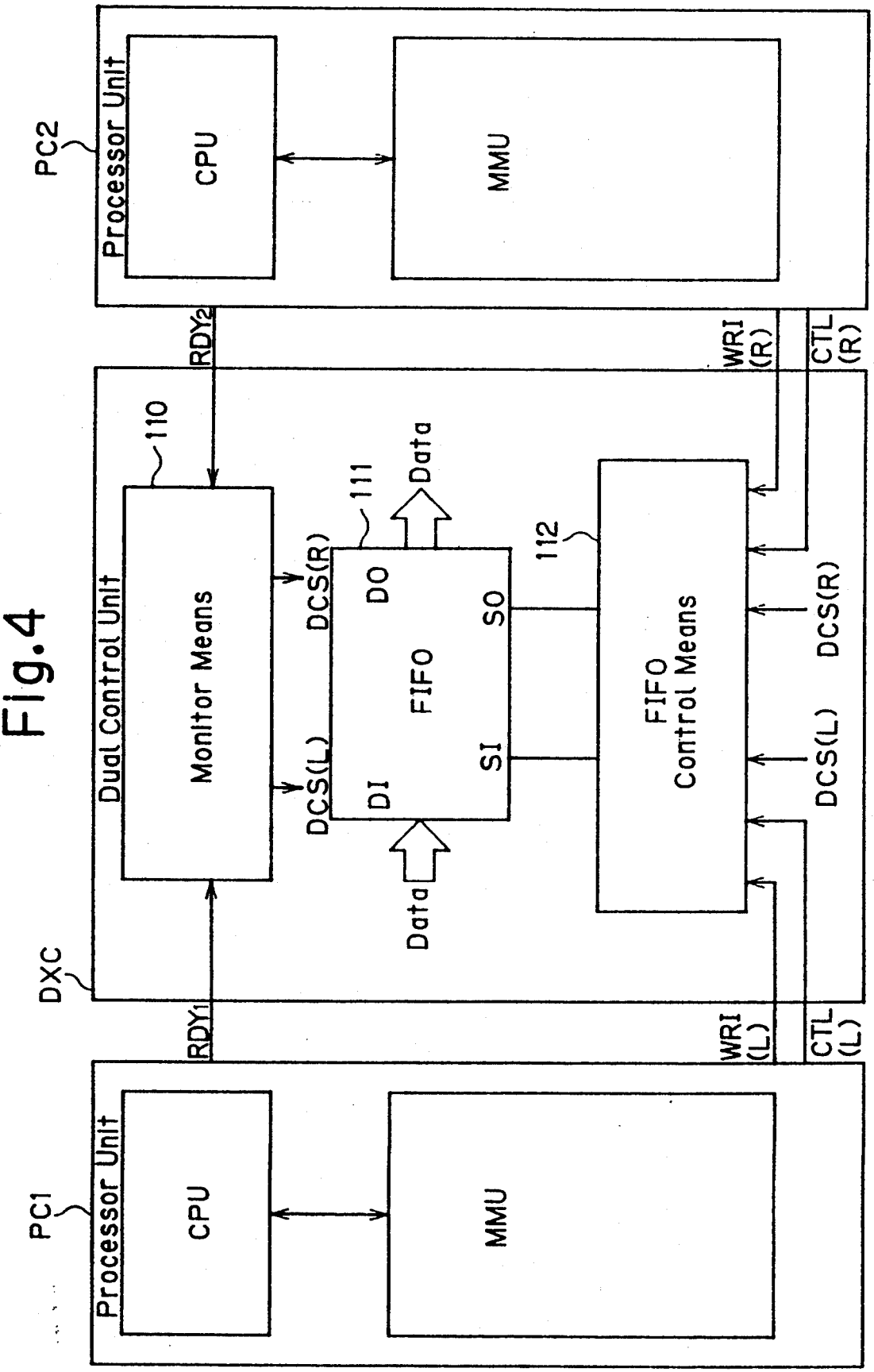
FIG. 4 is a block diagram depicting further details of the embodiment of FIG. 3.

FIG. 4 shows further details of the embodiment of FIG. 3 wherein processor units PC1, PC2, each comprises a processor CPU and a main memory MMU. Dual control unit DXC comprises monitor means 110 for monitoring signals RDY1, RDY2 indicating the operating states which are generated by each processor unit, and for deciding whichever processor unit is to be provided a control right. Monitor means 110 provides dual control signals $DCS_L$, $DCS_R$ for indicating which processor unit is to be in an actual operated state.

FIFO control means 112 inputs (1) dual control signals $DCS_L$, and $DCS_R$, (2) read/write signals $WRI_L$, $WRI_R$ from processors PC1, and PC2, and (3) control declaration signals $CTL_L$, $CTL_R$; and controls shift-in SI and shift-out SO of FIFO 111 according to the following logical expressions (1) and (2):

$$SI = ACC_L \cdot WRI_L \cdot CTL_L \cdot DCS_L + ACC_R \cdot WRI_R \cdot CTL_R \cdot DCS_R \quad (1)$$

$$SO = ACC_L \cdot \overline{WRI_L} \cdot CTL_L + ACC_R \cdot \overline{WRI_R} \cdot CTL_R \quad (2)$$

wherein WRI denotes an external read/write signal, which is asserted at the time of writing, wherein subscript L of each signal indicates from the left processor unit, and R indicates from the right processor unit; CTL denotes a control declaration signal, which is asserted by the unit under actual operation; DCS denotes a dual control signal with the dual control unit asserting DCS of the unit on the side to be provided with the control right, that is put into operation; and ACC is a signal which becomes active in case of write-access or read-access from the left processor unit or the right processor unit to the FIFO. The WRI becomes the "truth" when the access to the FIFO is a write operation, and $\overline{WRI}$ becomes the "truth" when the access to the FIFO is a read operation.

Details of the signals are further explained as follows:

ACCx=This signal indicates access to FIFO.

WRx=This signal represents a condition of the ACCx access and distinguishes between Write and Read, namely, WRx is active (WRx is true) =access becomes write WRx is inactive ($\overline{WRx}$ is true)-=access becomes read Thus, ACCx AND WRx=Writing action to FIFO. ACCx AND $\overline{WRx}$=Reading action to FIFO. and these terms exist in expressions (1) and (2).

DCSx is a signal outputted by DXC (dual control unit)

CTLx is a signalt outputted by software program in CPU. If DXC detects abnormality in the control side, it prohibits writing action to FIFO by changing DCSx immediately to an inactive state. Thus, when DXC detects an abnormality, even though the CPU has not yet recognized the abnormality, and CTL continues in an active state, the contents of FIFO is preserved. Accordingly, terms CTL and DCS exist in combination in expression (1).

CTL=a signal representing that CPU keeps control.

$\overline{CTL}$=inactive state of CTL, i.e. standby state of CPU. This does not show abnormality of the apparatus.

Signal $\overline{CTL}$ exists in expression (2) to protect the contents of the FIFO. A standby state CPU permits reading action to FIFO. An operated state CPU prohibits reading action to FIFO. This is not a normal action. It is necessary to protect the contents of the FIFO because the FIFO loses the contents after read out. The possibility of a former operated state CPU beginning to read FIOF after detecting an abnormality and changing CTL to inactive is not large since use of wrong data is checked by equalizing of data.

According to the FIG. 4 system, in case FIFO 111 is subject to the expressions (1) and (2) above recited from FIFO control means 112, shift-in SI and shift-out SO are controlled, and data in FIFO 111 can thus be written and read. However, access to FIFO 111 is inhibited otherwise, and hence data is protected. Access from the two processor units PC1, PC2 is assumed. However, dual control unit DXC itself is capable of accessing otherwise. Also, FIFO access is effected subject to satisfying the predetermined logical expressions. FIFO access protection is thus improved and a dual control of high reliability is provided.

Figure 5:
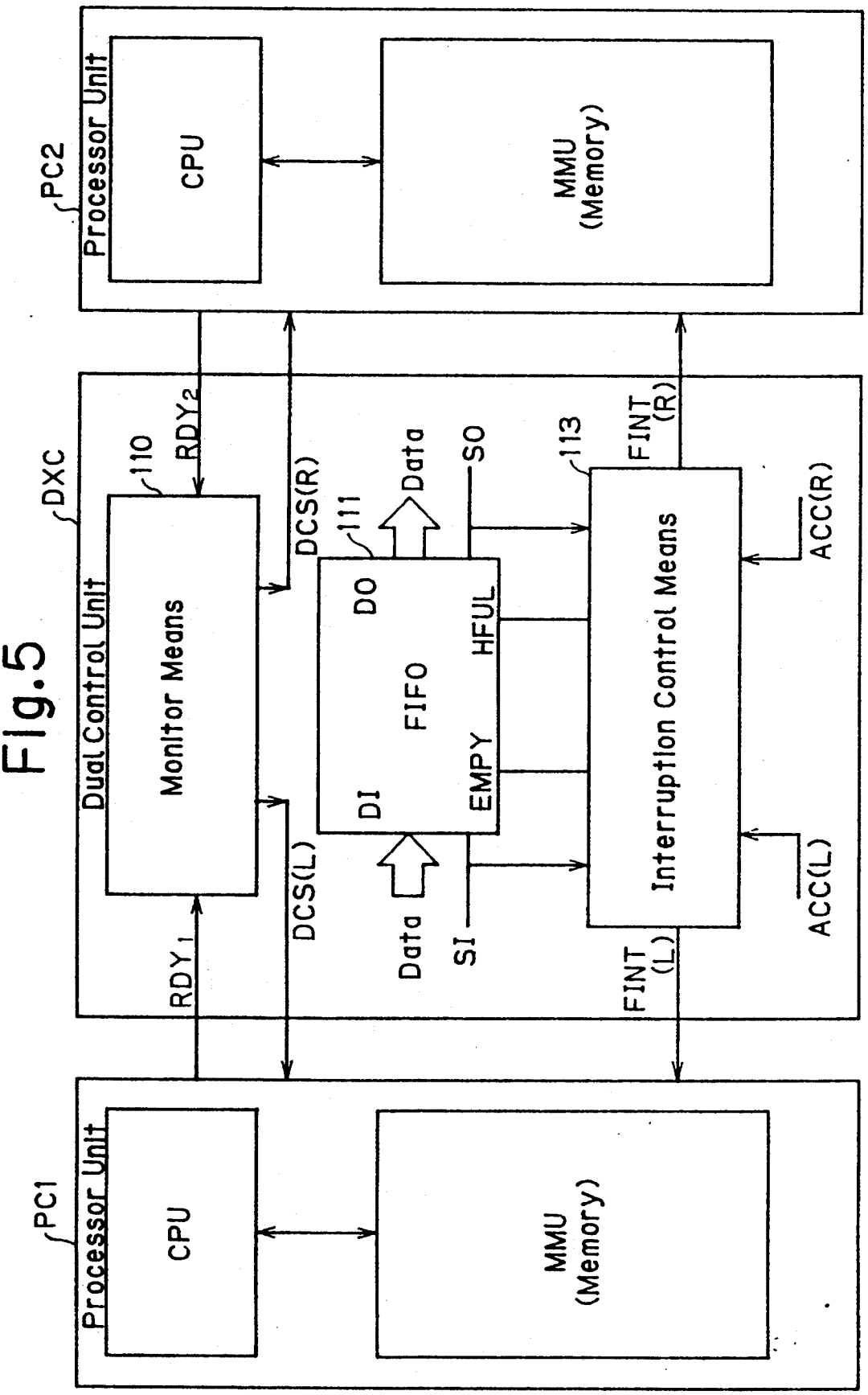
FIG. 5 is a block diagram depicting a still further illustrative embodiment of the invention.

In FIG. 5, if FIFO is used, as shown in FIG. 4, as an equalizing means for the memory content, data reading from FIFO of the processor unit on standby becomes slow as compared with data writing in FIFO from the processor unit in operation. Then, it would be difficult to secure accurate data transmission. The FIG. 5 embodiment has solved such a problem to realize accurate data transmission on FIFO.

In FIG. 5, interruption control means 113 generates interrupt signals $FINT_L$ and $FINT_R$ which are applied to the two processor units according to a logic of signals, such as access signals generated from processor units PC1, PC2, signal EMPY, indicating a loaded data volume being empty, and signal HFUL, indicating a loaded data volume being half which are generated from FIFO 111, shift-out signal SO, and shift-in signal SI. This keeps the processor units from being interrupted according to a priority of data reading unless necessary.

The interrupt signals $FINT_L$, $FINT_R$ for indicating "interrupt" according to a priority of data reading to the two processor units, are generated according to the following logical expressions (3) and (4).

$$FINT_L = ACC_R \cdot SI \cdot HFUL \cdot IF_L + ACC_L \cdot FIN_L + IRST \cdot FIN_L \quad (3)$$

$$FIN_L = FINT_L$$

$$FINT_R = ACC_L \cdot SI \cdot HFUL \cdot IF_R + ACC_R \cdot FIN_R + IRST \cdot FIN_R \quad (4)$$

$$FIN_R = FINT_R$$

$$IF_L = (FIN_L \cdot IF_L + SO \cdot ACC_L \cdot EMPY)$$

$$IF_R = (FIN_R \cdot IF_R + SO \cdot ACC_R \cdot EMPY)$$

wherein, ACC denotes an access signal to interruption control means, with subscript L indicating from the left side processor unit, and R indicating from the right side processor unit; SO denotes a shift-out signal from FIFO; SI denotes a shift-in signal from FIFO; HFUL denotes a half full signal generated when a half volume of data is loaded in FIFO; EMPY denotes an empty signal generated when FIFO becomes empty; $FINT_L$ denotes an interrupt signal provided to the left processor unit; $FINT_R$ denotes an interrupt signal provided to the right processor unit; IRST denotes a reset signal for the interrupt signals $FINT_L$, $FINT_R$ provided from the right or left side processor unit when access signal ACC is asserted.

Figure 6:
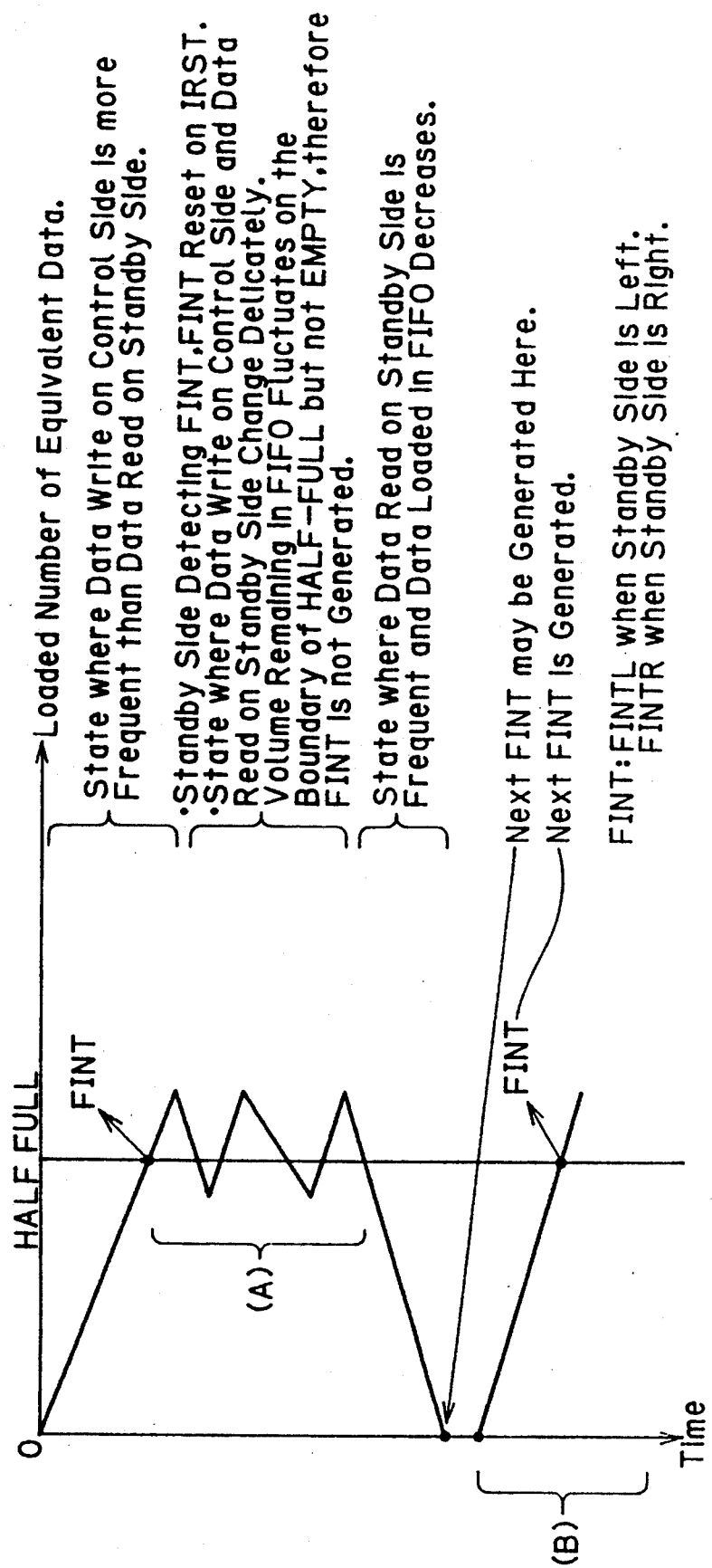
FIG. 6 is an operational conceptual diagram depicting one example of the operation.

FIG. 6 shows one example of the operation of the FIG. 5 system, wherein a number of equivalent data loaded in FIFO is taken in the direction of the X-axis and time in the direction of the Y-axis. Let it be assumed that the left processor unit is operating, and the right processor unit is on standby. If data writing in FIFO from processor unit PC1 in actual operation is more frequent than data reading by the processor unit PC2 on standby, then the loaded number of data is gradually increased as illustrated, reaching half of the total volume in due course. Then, the half-full signal HFUL is generated from FIFO 111. Upon receipt of the half-full signal HFUL, interruption control means 113 generates interrupt signal $FINT_R$ according to the logical expression (4). Upon detection of the interrupt signal, the processor PC2 on standby resets the interrupt signal $FINT_R$ on the reset signal IRST, and assigns a priority of data reading from FIFO 111. Thus, the number of data loaded in FIFO 111 is decreased gradually. When a data read rate from processor unit PC in operation and a data read rate from processor PC2 on standby change delicately again, a volume of data loaded in FIFO 111 fluctuates on the boundary of half full, as shown in the portion labeled (A). However, the empty signal EMPY has not yet been asserted in the state. Hence, the interrupt signal $INT_R$ according to expression (4) is not generated.

A data read operation of processor unit PC2 on standby from FIFO is quick, the loaded data decreases, and when it becomes empty in due time, empty signal EMPY is asserted. The number of data loaded in FIFO 111 increases thereafter, as shown in the portion labelled (B). When it reaches half full, the interrupt signal $INT_R$ is generated according to expression (4), thus assigning a priority of data read for processor unit PC2 on standby.

Figure 7:
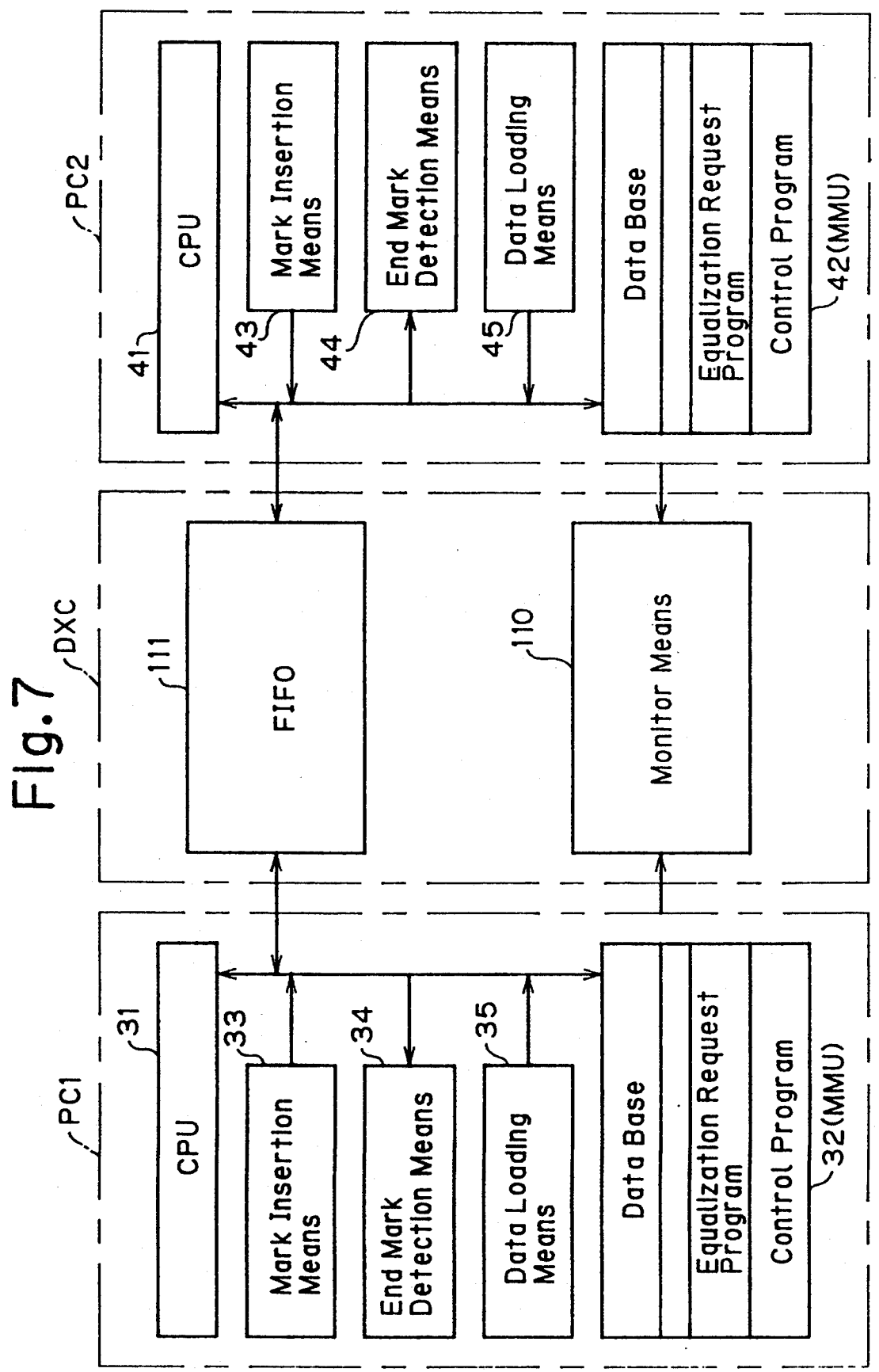
FIG. 7 is a block diagram depicting a further illustrative embodiment of the invention.

FIG. 7 depicts an embodiment wherein components are provided within the processor units to control how far the actual operation is carried out at the time of control transfer from one processor unit to the other, and to continuously carry out the actual operation when the control is transferred. Processor units PC1, PC2 comprise CPU 31,41; main memories 32,42, wherein are loaded various data bases, control programs, equalization request programs activated upon request from the control programs, etc; loading means 33,43 for loading a start mark and an end mark in FIFO 111 provided within dual control unit DXC at points in time whereat the actual operation starts and ends; end mark detection means 34,44 for detecting whether or not the end mark is present in the data read out from FIFO 111; and data loading means 35,45 for loading data from the start mark to the end mark in main memories MMU 32,42 when the end mark is detected.

Operation of the FIG. 7 system is as follows. Processor unit PC1 is in actual operation state and processor unit PC2 is in standby state. Processor unit PC1 carries out, for example, feedback control and sequence control according to a control program, and updates a data base in main memory 32. For the updated data required to have the memory content of processor unit PC2 on standby equalized, an equivalent data frame is prepared according to a request from the equalization request program, and is loaded in FIFO 111.

Mark insertion means 33 inserts a start mark and an end mark at the points in time whereat the actual operation starts and ends respectively. That is, in case processor unit PC 1 operates, for example, for control of a plurality of control loops, the start mark and the end mark are inserted at the points in time whereat a control of one loop starts and ends, and in case sequence control is performed according to a plurality of sequence tables, the start mark and the end mark are inserted whenever one sequence table is manipulated.

Figure 8:
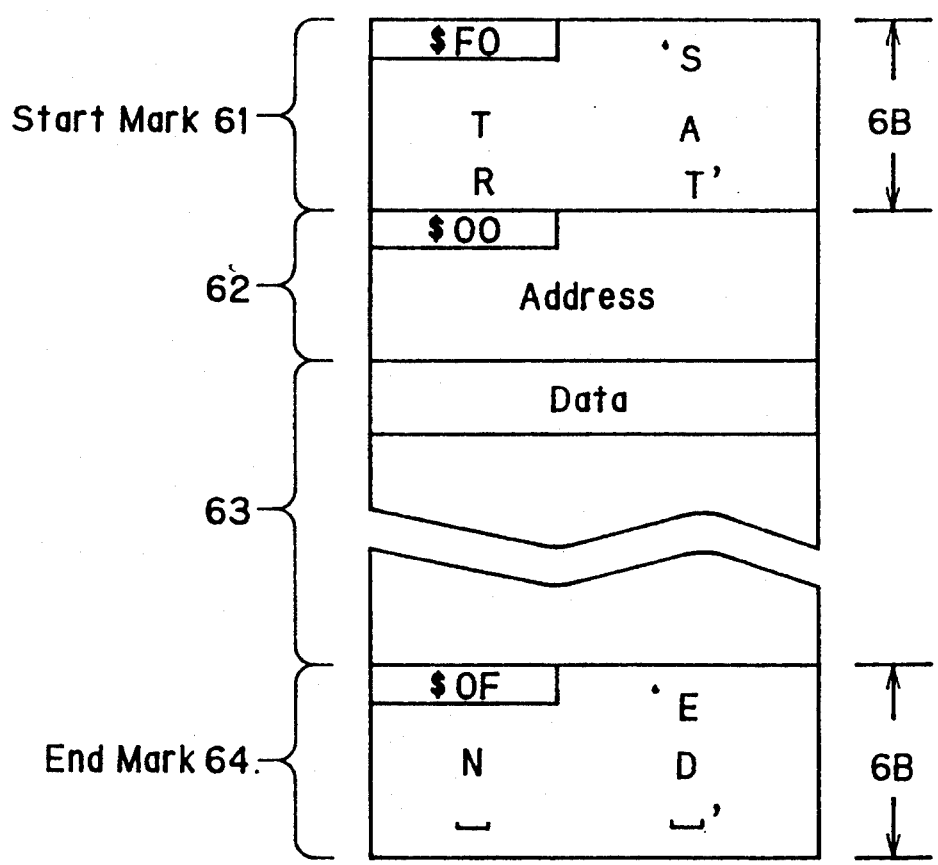
FIG. 8 is a block diagram depicting a frame construction of an equalizing data loaded in the FIFO memory of FIG. 7.

FIG. 8 shows one example of the equivalent data frame loaded in FIFO 111. The equivalent data frame comprises a start mark 61, a write address 62 of a memory of the processor unit on standby, a plurality of updated data 63, and an end mark 64.

Processor unit PC2 on standby reads data from FIFO 111 and loads that data into its memory 42. For loading in memory 42, end mark detection means 44 detects whether or not the end mark is present in the data read out from FIFO 111. If the end marks is present, then data 63, placed between the start mark 61 and the end mark 64, is loaded at address 62. If the end mark is not detected, no loading occurs.

Figure 9:
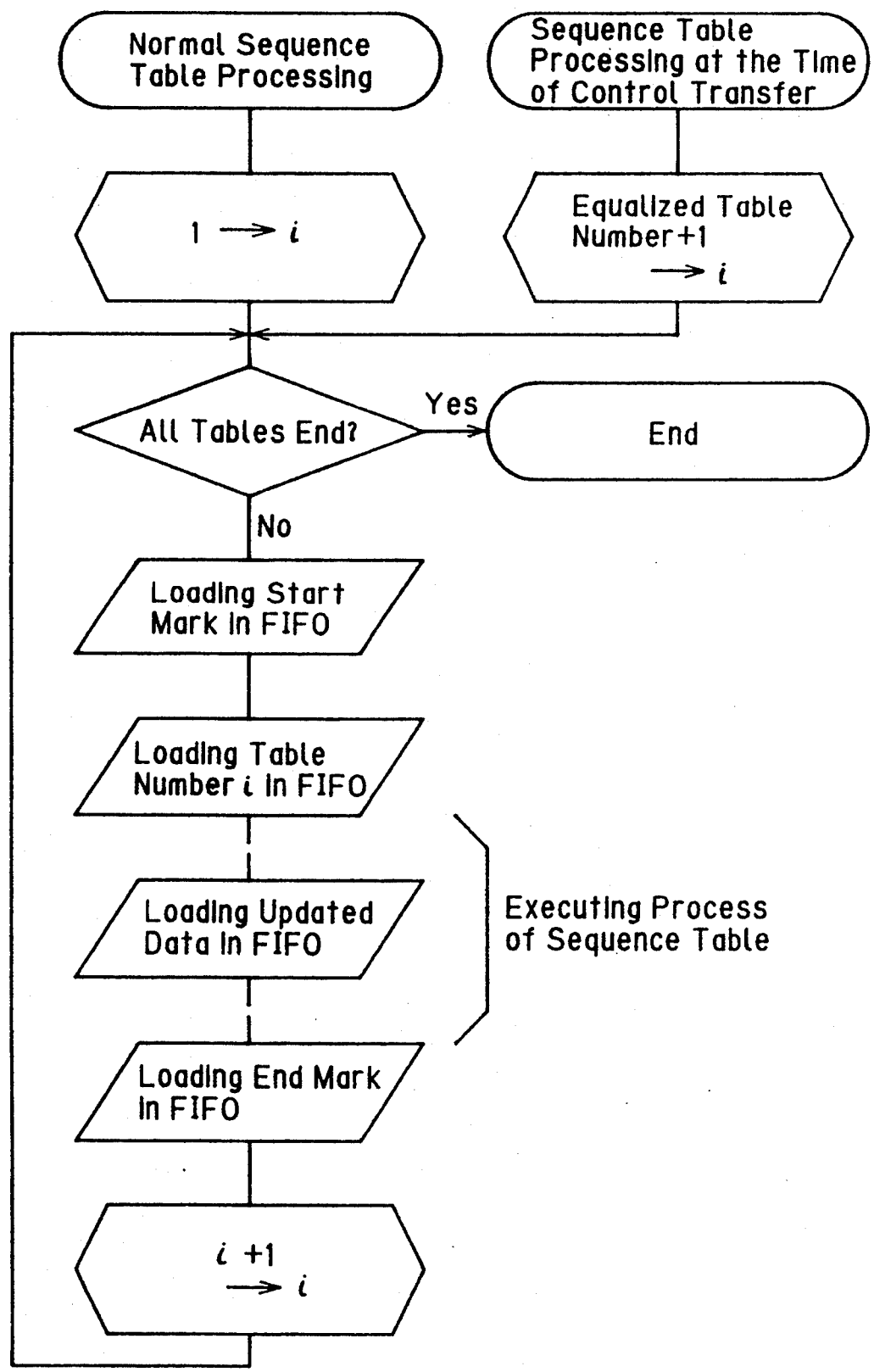
FIG. 9 is a flow chart for carrying out a sequence table processing of one processor unit in the process control of FIG. 7.

FIG. 9 is a flow chart showing a sequence table processing of the processor unit PC1 in actual operation, wherein prior to manipulation of one sequence table, a start mark ahead and a table address i are loaded in FIFO 111 of dual control unit DXC. In a table which is running, a data base of memory 32 of processor unit PC1 in actual operation is updated, and an address for data to be equalized and the data are loaded in FIFO 111. The end mark is loaded in FIFO 111 at the last step of the table processing.

Figure 10:
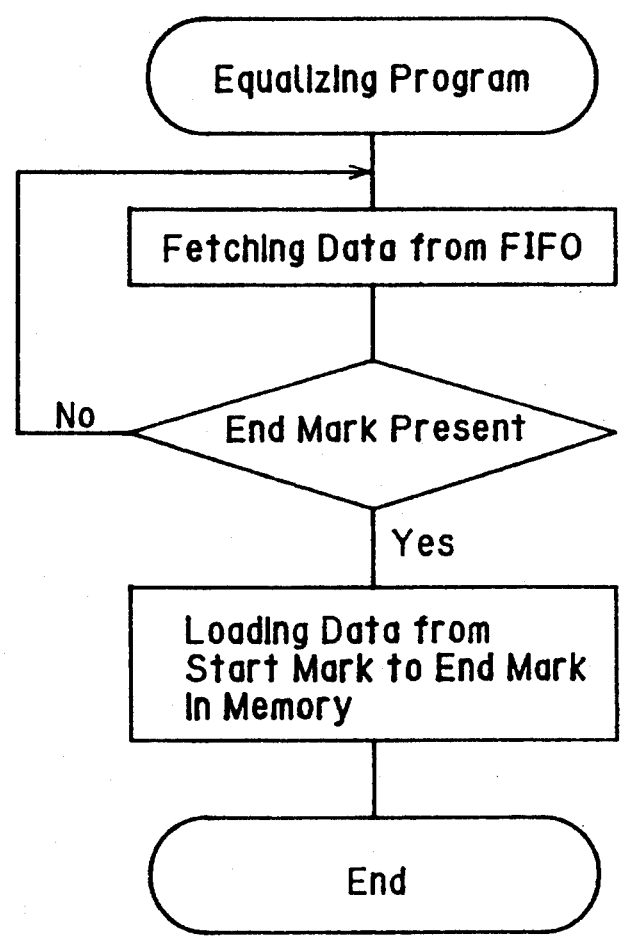
FIG. 10 is a flow chart depicting an equalizing operation carried out by another processor unit of FIG. 7.

FIG. 10 is a flow chart indicating equalization operation of processor PC2 which is on standby, wherein processor unit PC2 reads data out of FIFO 111, and detects whether or not an end mark is present therein. Where an end mark is detected, it loads data between the start mark and the end mark in memory 42, thus completing the equalization.

From effecting the above operation fully at every table, data updated in processor unit PC1 on standby is loaded successively at a designated address of memory 42 of processor unit PC2 on standby through FIFO 111.

When processor unit PC1 gets faulty during the sequence table execution, and thus control right is transferred to processor unit PC2 which is on standby, processor unit PC1 stops inserting the end mark in FIFO 111. As a result, the data based updated by the table during processing will not be loaded in memory 42 of processor unit PC2 which is on standby. Accordingly, processor unit PC 2 having received the control right will start processing from the equalized table number +1 table (i.e. the table in execution prior to the control transfer). Thus, continuity of control is ensured.

According to the embodiment, in the processor unit having the control right, a start mark and an end mark are inserted in the data to be loaded in FIFO 111 at points in time whereat the actual operation starts and ends respectively. On the other hand, the processor unit on standby has data to be equalized loaded in its own memory when the end mark is detected. Thus, the processor unit having the control right will obtain the control state immediately before the control right, thus insuring continuity of control.

Figure 11:
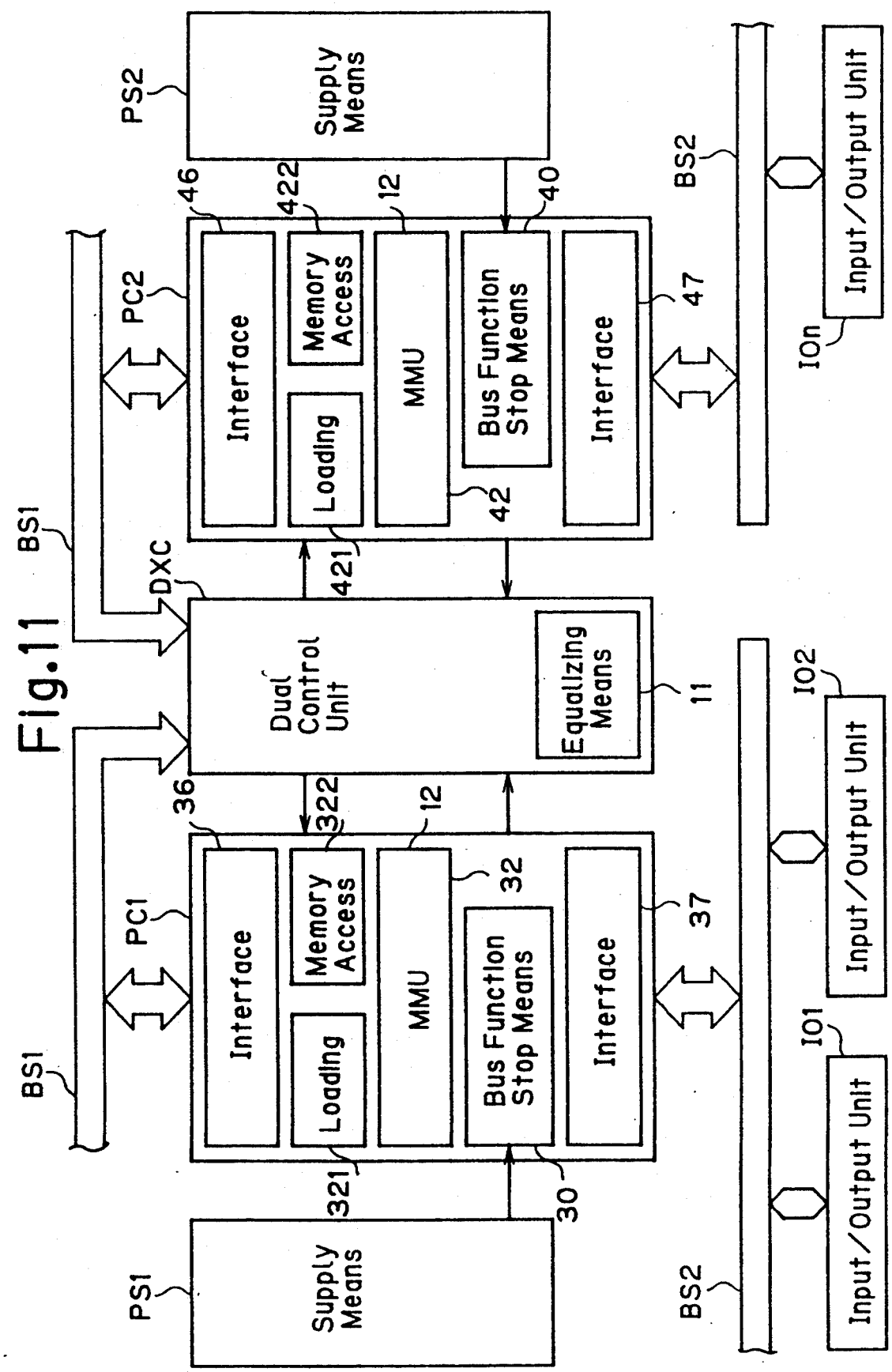
FIG. 11 is a block diagram depicting a still further illustrative embodiment of the invention.

FIG. 11 depicts an embodiment which has the following and other features. In case one of the processor units is demounted from a back board or subjected to on/off operation of a supply at the time, for example, of maintenance, a disturbance will not be exerted on a bus leading to the processor units. The embodiment comprises two supply means PS1, PS2 for feeding operating power to processor units PC1, PC2 respectively; a first bus BS1 connecting the processor units PC1, PC2 and transmitting data for equalizing the data base; input/output units $IO_1 \ldots IO_n$ which vary in type and function to input signals from the process, output signals to the process, have communication functions, and transmit signals to other systems, etc; and a second bus BS2 for exchanging data between processor units PC1,PC2 and input/output units $IO_1 \ldots IO_n$, and being connected to both the groups on the left and right sides thereof. The second bus BS2 uses a standard bus and connects various input/output units.

Processor units PC1, PC2, each comprises bus function stop means 30,40 for stopping at least the data transmission function of first bus BS1 in an output voltage transient state at the time of on/off operation of the corresponding supply means and also at the time of the power being off; memories 32,42 for storing data base therein; interfaces 36,46 of first bus BS1; interfaces 37,47 of second bus BS2; loading means 321,421 for loaidng program and data base in memories MMU 32,42; memory access means 322,422 which are capable of accessing equalizing data in dual control unit DXC or in a memory space in the opposite processor unit other than its own memories.

If each operation is normal, processor units PC1, PC2 generate and apply signals to the dual control unit DXC accordingly. Dual control unit DXC then monitors the signals and decides which processor unit to operate and which processor unit to keep on standby.

A necessary data base and program are loaded in memories 32, 42, in each processor unit, from a host computer (not shown) at the time of initialization by loading means 321,421 through the input/output units having a communication function and second bus BS2.

In an operating state, the contents of memory 32, for example, in the processing unit in actual operation, are copied successively according to operation of equalizing means 11 in dual control unit DXC through first bus BS1 and so updated into memory 42, for example, in the processor unit on standby. Then, the processor unit in operation exchanges data with each input/output unit IO by means of second bus BS2, thus, carrying out a predetermined control operation, etc.

In such a state, if there arises a failure in the processor unit in operation, it is detected by dual control unit DXC, and the processor unit on standby is changed to come into actual operation. In such a case, the contents of the memory in the processor unit on standby are updated at all times to be the same as those of the memory in the processor unit in operation. Thus, the control operation is transferred smoothly from one processing unit to the other.

The processor unit having a failure has first the relative power kept off for repair. Bus function stop means 30, for example, inputs a signal INZ, indicating the power as being off, from the corresponding supply means PS1 or the transient state of the output voltage, and stops at least the data transmission function of the corresponding first bus BS1. Thus, the first bus BS1, leading to the processor unit having a failure, is kept from suffering any disturbance.

FIG. 12 shows bus function stop means 30,40, wherein an open collector gate, such as for example, 7438, 74LS38, 74ALS38U, or the like, GA is used therefor. A bus control signal and the signal INZ from supply means PS are impressed on an input end of the gate.

FIG. 13 shows graphically signal INZ generated by supply means PS. If a supply voltage Vc changes as power is kept on or off, as shown in line (a), the signal INZ becomes high in level as shown in line (b) when the supply voltage Vc reaches an operable range of the processor unit.

The interface 37 or 47 in the processor unit having the power kept on or off uses the open collector gate GA, shown in FIG. 12, at least for the output gate of the control signal, which controls first bus BS1 to stop the data transmission function when the signal INZ is low in level, that is, at the time of a transient state of supply voltage Vc when the power is off, and at the time of the power being off. Thus, the dual control unit or the opposite processor unit is kept from influencing the operation through first bus BS1.

Figure 14:
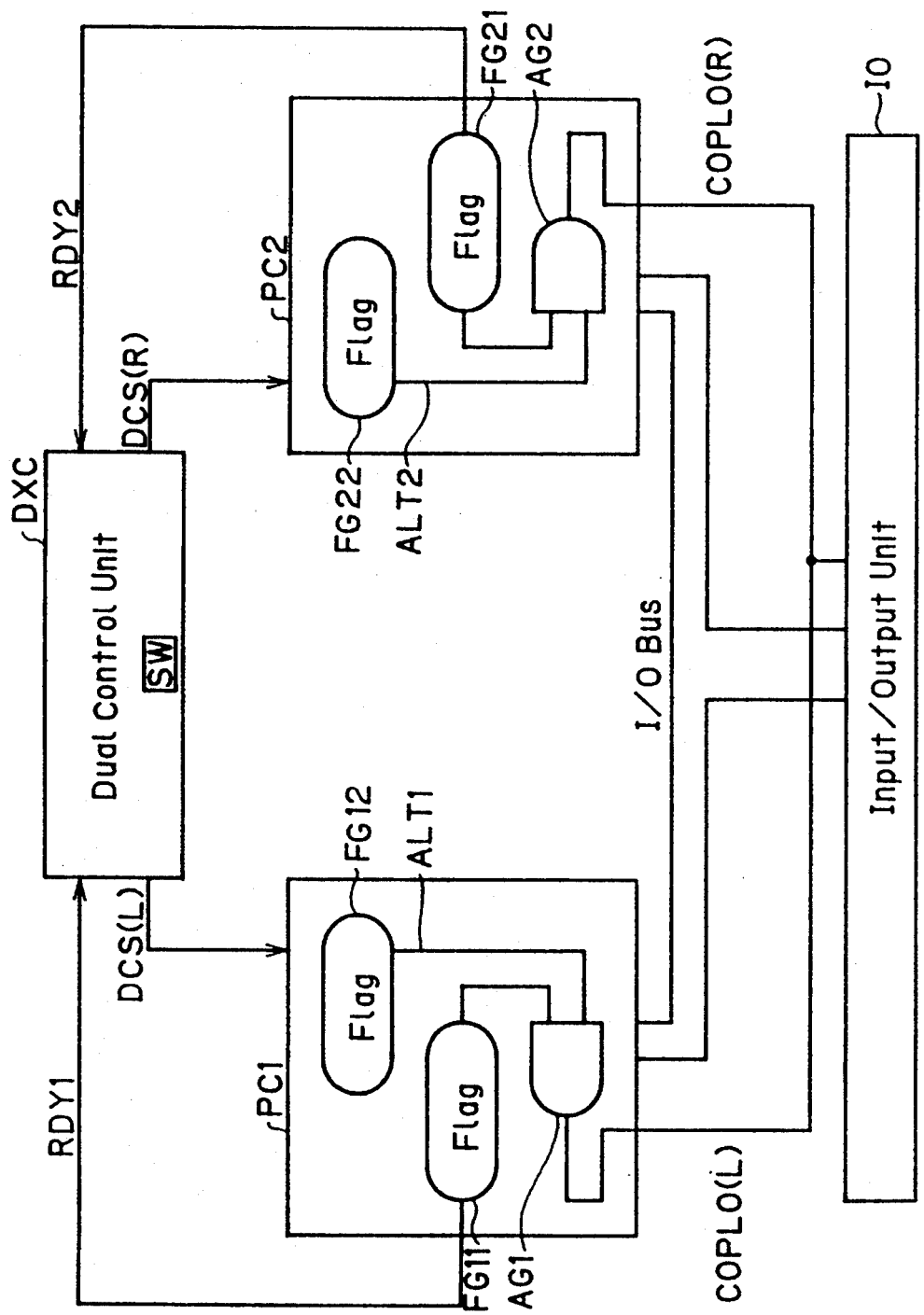
FIG. 14 is a block diagram depicting another illustrative embodiment of the invention.

FIG. 14 shows an embodiment for smoothing switching operation between the processor units in operation and on standby when an abnormality occurs in the processor unit in operation. Ready signal flags FG11, FG21 for generating ready signals RDY1, RDY2 indicating normal operation, and capability signal flags FG12, FG22, indicating a capability of being an operational state itself are provided in the two processor units PC1, PC2. Logical operation output means AG1, AG2 are provided to receive as inputs a ready signal FDY (flags FG11,FG21 output RDY1, RDY2 at both terminals thereof) and a capability signal ALT from the two flags FG11, FG12 respectively, and operating a logical product of both the signals arithmetically, then transmitting operation output signals $COPLO_L$, $COPLO_R$ to the input/output unit IO as permission signals. $AG_1$ and $AG_2$ may be AND gates.

The capability signal flags FG12, FG22 may be set up according to a state of set switch SW provided on dual control unit DXC and a packaged state of dual control unit DXC and the processor units PC1, PC2 in the system, e.g. on a back board. Set switch SW is used for selecting manually processor unit PC1 or PC 2 to be operated at the time of maintenance work, etc.

If set switch SW has selected processor unit PC1, for example, flag FG12 in processor unit PC1 is asserted, and flag FG22 in processor unit PC2 is negated. Then, if set switch SW is set in a normal state, the state of both flags FG12,FG22 in processor units PC1, PC2 are set up.

The operation of the FIG. 14 embodiment at the time of steady state and abnormal state will now be described with reference to the case where set switch SW is set first to the steady state. FIG. 15 depicts such a state.

Steady State Operation

Since switch SW in dual control unit DXC is set to steady state in this case, flags FG12, FG22 in processor units PCL, PC2 are asserted as shown in FIG. 15, lines (b) and (g) of portion (A), respectively.

Processor units PC1, PC2 are operating normally, both ready signals RDY1, RDY2 from flags FG11, FG21 are active, and upon receipt of the signals, dual control unit DXC keeps control Signal $DCS_L$ asserted and $DCS_R$ negated so as to bring processor unit PC1 into operation and processor unit PC2 to standby state.

Upon receipt of signals from two flags FG11, FG12 and FG21,FG22, logical operation output means AG1, AG2 in processor units PC1,PC2 generate permission signals $COPLO_L$, $COPLO_R$ for asserted state to each input/output unit IO. Upon receipt of the permission signals, input/output unit IO is kept to an operating state and accessed on a signal from the processor unit PC1.

Operation at the Time of Abnormality Generation

When an abnormality arises on or in processor unit PC1 from the above operating state, a self diagnosis means detects the abnormality and the ready signal flag FG11 is negated, as shown in line (a) of portion (B). The capability signal flags FG12, FG22 are both kept asserted, as shown in lines (b) and (g).

After the ready signal RDY1 is negated, logical operation output means AG1 negates the logical operation output signal, i.e. the permission signal, $COPLO_L$. However, output signal $COPLO_R$ from the other logical output means AG2 is left asserted, as shown in line (h). Thus, the input/output unit IO continues the operation thereon.

After ready signal RDY1 is negated, dual control unit DXC negates one control signal $DCS_L$ and asserts the other control signal $DCS_R$. After control signal $DCS_R$ is asserted, processor unit PC2 accesses the input/output unit IO through the IO bus.

According to the foregoing operation, if an operating abnormality arises in one processor unit, both permission signals COPLO to the input/output unit IO will never be negated, thus ensuring a smooth switching operation.

FIG. 16 is a time chart indicating operation when the set switch SW in dual control unit DXC is set to select, for example, the processor unit PC1.

Steady State

Dual control unit DXC asserts control signal $DCS_L$ as shown in line (d) so that processor unit PC1 is ready for operation, and negates control signal $DCS_R$, as shown in line (e) so that processor unit PC2 is on standby. The capability signal flag FG12 in processor unit PC1 is kept asserted, as shown in line (b) by a decision,indicated from the state of set switch SW, that flag FG12 is capable of being on the operation side. Then, the capability signal flag FG22 is kept negated, as shown in line (g) by a decision, indicated by the state of set switch SW, that flag FG22 is not capable of being on the operation side. Accordingly, the logical operation output signal $COPLO_L$ is kept asserted, as shown in line (c), the logical operation output signal $COPLO_R$ is kept negated, as shown in line (h), and the input/output unit IO is accessed by the processor unit PC1.

At the Time of Abnormality Generation

When an abnormality arises in processor unit PC1, ready signal flag FG11 is negated, as shown in line (a). Then, logical operation output means AG1 negates output signal $COPLO_L$, as shown in line (c).

Dual control unit DXC detects that the ready signal RDY1 is negated. However, since set switch SW has already been set to select processor unit PC1, control signal $DCS_L$ is left asserted, as shown in line (d), and control signal $DCS_R$ is left negated, as shown in line (e). Accordingly, output signal $COPLO_R$ of logical operation output means AG2 remains negated, as shown in line (h).

After output signal $COPLO_L$ of logical operation output means AG1 is negated, with the output signal $COPLO_R$ of logical operation output means AG1 having already been negated, the input/output unit IO does not follow access from the IO bus.

According to the above operation, in case set switch SW has selected one processor unit, it can be made to not follow the access from the IO bus unpreparedly according to output signals from logical operation output means AG1, AG2, thus ensuring reliability of operation.

Figure 17:
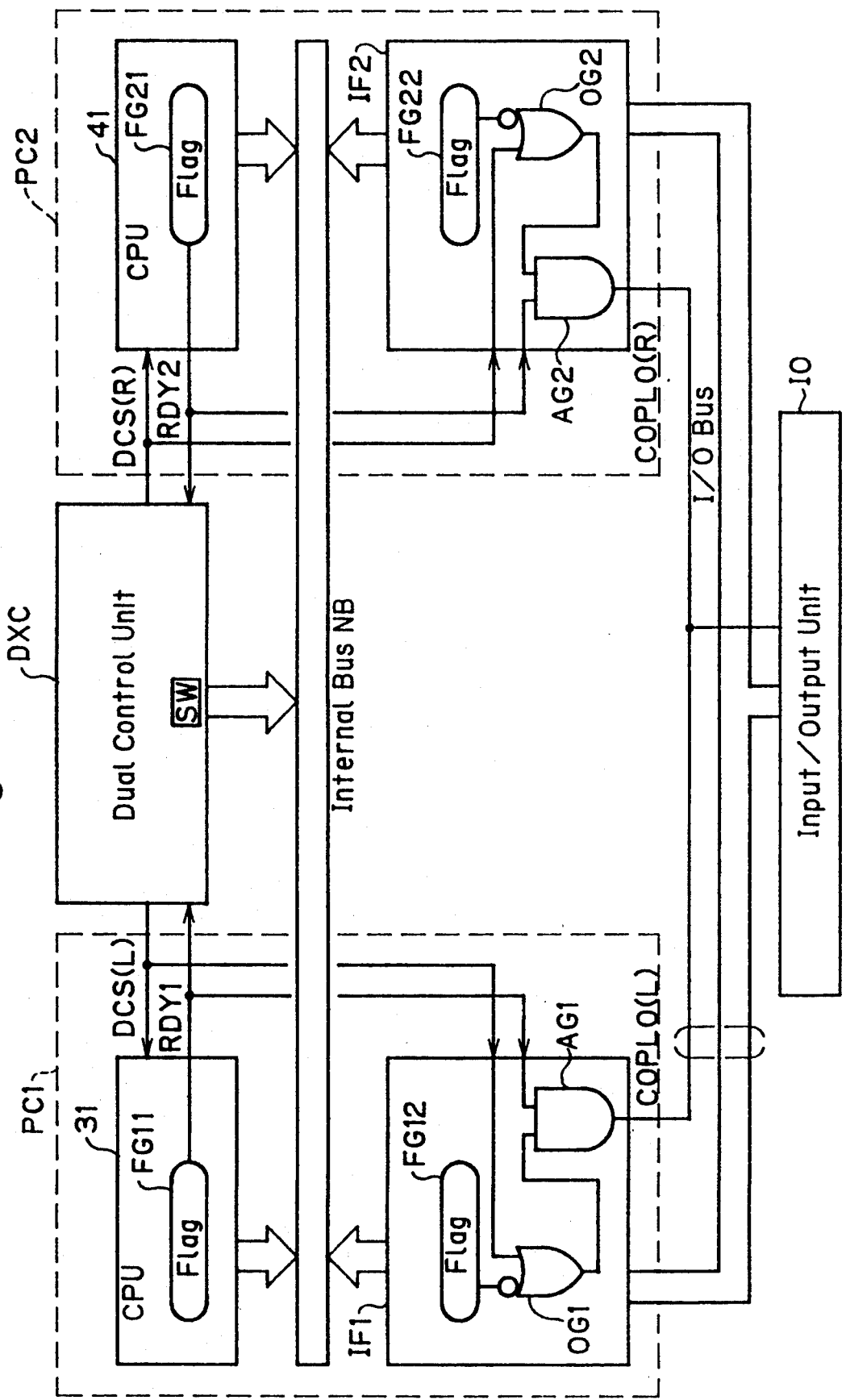
FIG. 17 is a block diagram depicting another illustrative embodiment of the invention, similar to that of FIG. 14.

FIG. 17 shows another embodiment, wherein processor units PC1, PC2 each comprises microprocessor parts CPU 31,32 and interface parts IF1, IF2, respectively being connected together by an internal bus NB. Ready signal flags FG11, FG21 are provided on microprocessor parts 31, 32 and the capability signal flags FG12,FG22 are provided on interface parts IF1, IF2.

Gates OG1, OG2 are provided for inputting capability signals from flags FG12, FG22, and control signals $DCS_L$, $DCS_R$ from dual control unit DXC. Logical operation output means AG1, AG2 receive signals generated by gates OG1, OG2 and ready signals RDY1, RDY2 from flags FG11, FG21, and produce output signals $COPLO_L$, $COPLO_R$ which are provided to input/output unit IO through the I/O bus.

Capability signal flags FG12, FG22 are capable of monitoring whether or not dual control unit DXC itself is operating normally, and whether or not dual control unit DXC is packaged through internal bus NB. In case the dual control unit DXC is not operating normally or is not packaged in the system, the situation is like that in which set switch SW has selected either one of the processor units.

Then, the above description refers to the case where, for example, processor unit PC1 is operated. However, the system operates in the same manner when the other processor unit PC2 is operated.

FIG. 18 shows an embodiment which facilitates dismounting of the dual control unit from the system. Dual control unit DXC generates control permission signals IOCE1, IOCE2 for operating one of the processor units PC1, PC2 as a main system, and the other as the subsidiary or standby system. Dual control unit DXC comprises an insertion detection part 13 for detecting the case where the dual control unit DXC is dismounted from and/or inserted into the system. For example, the detection part 13 detects when contact is broken from pulling a printed board out of a connecting part, for example, thus detecting dismounting of the unit from the system.

First and second output gates 141,142 are provided for generating control permission signals IOCE1, IOCE2, to processor units PC1, PC2, respectively, and a control part 14 generates a control signal to control the first and second output gates 141,142 according to a signal from insertion detection part 13. A third output gate 143 is provided for generating a ready signal DXRDY upon receipt of a signal DXRDYi, indicating that dual control unit DXC is operating normally, from control part 14.

In processor unit PC1, an open collector output gate G11 receives its own ready signal RDY1, control permission signal IOCE2 from second output gate 142 in dual control unit DXC, and ready signal DXRDY from third output gate 143; and outputs signal IOCE1. A gate IN1 receives signal IOCE1 via a line connected to the output terminal of output gate G11 and a control permission signal IOCE1 from first output gate 141, and generates a permission signal O1 for actuating the processor unit PC1 as the main system.

In processor unit PC2, an open collector output gate G21 receives its own ready signal RDY2, control permission signal IOCE1 from first output gate 141, and ready signal DXRDY from a third output gate 143 and produces a signal IOCE2. Gate IN2 receives signal IOCE2 via a line connected to an output end of output gate G21 and control permission signal IOCE2 from first output gate 142, and generates a permission signal O2 for actuating processor unit PC2 as the main system.

Resistances R1,R2 are provided for pulling up the level of the lines to which control permission signal IOCE1, IOCE2 are generated.

Figure 19:
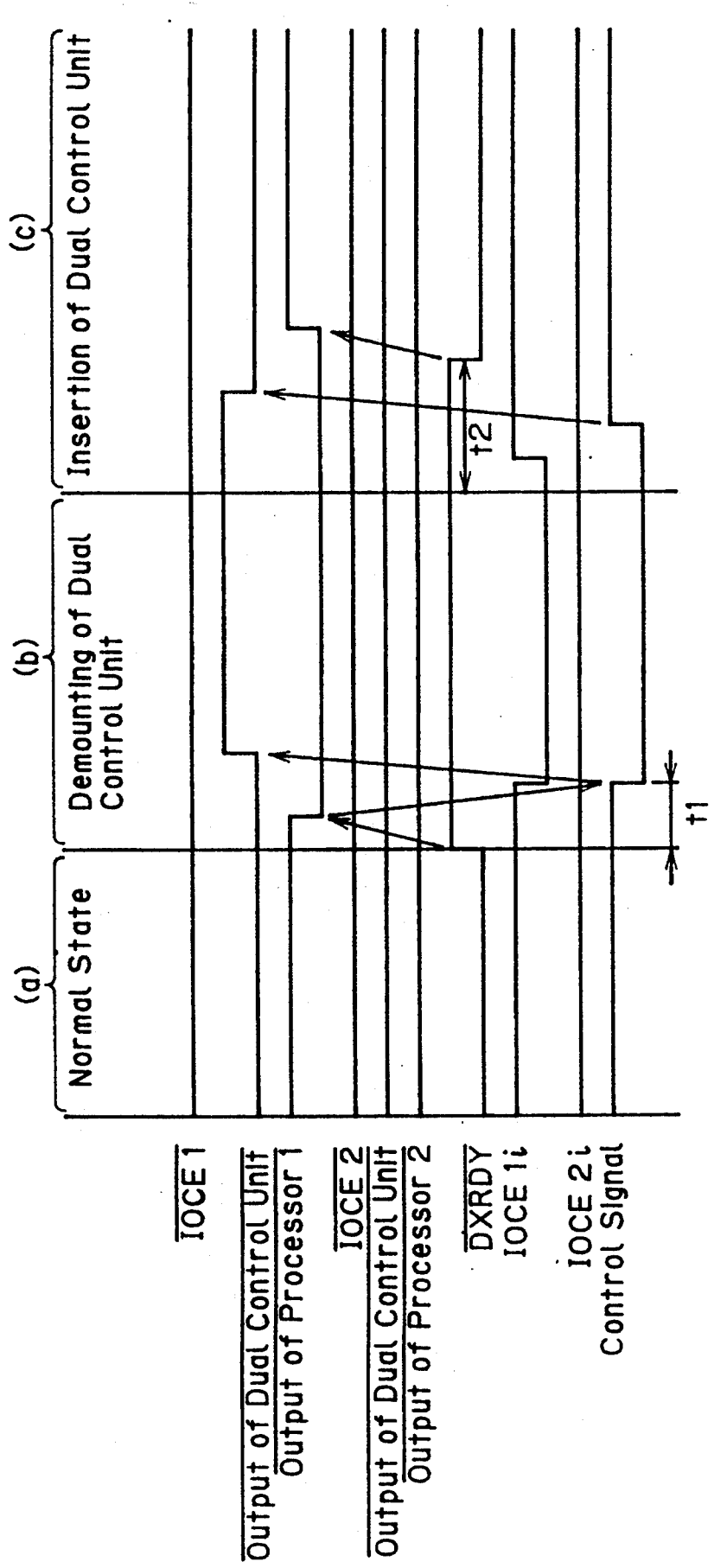
FIG. 19 is an operating waveform depicting the signal level in each state.

Operation of the FIG. 18 system will now be described with reference to FIG. 19 and for the cases where the system is operating normally, when dual control unit DXC is dismounted, and when dual control unit DXC is inserted. FIG. 19 shows operating waveforms of signal levels in each operating state. In the drawing a line put on signals indicates a "low active" state.

Normal State

The state is such that processor unit PC1, PC2 and dual control unit DXC are all operating normally, and ready signals RDY1, RDY2 and DXRDY are all active.

In such a state, dual control unit DXC selects processor unit PC1 as the main system, control permission signal IOCE1 is made active, control permission signal IOCE2 is made inactive, and the control signal (not labelled) is made active (see portion (a) of FIG. 19). Of course the unit DXC can also select PC2 just as well.

With control permission signal IOCE1 being active, processor unit PC1 operates as the main system according to permission signal O1. In this case open collector output gate G11 is closed, since ready signal DXRDY is active.

With control permission signal IOCE2 being inactive, processor unit PC2 operates as the subsidiary system. In this case, open collector output gate G21 is closed, since ready signal DXRDY is active.

Dismounting the Dual Control Unit DXC

In case dual control unit DXC is dismounted from the system while the normal state is in existence, first insertion detection part 13 detects the dismounting. Upon receipt of a signal from insertion detection part 13, control part 14 makes the ready signal DXRDY inactive, as shown in FIG. 19, part (b).

When ready signal DXRDY becomes inactive, gate G11 in processor unit PC1 opens, and an active level is generated. Control permission signal IOCE1 being active, at a low level, gate G21 in processor unit PC2 remains closed.

After ready signal DXRDY is made inactive, control part 14 in dual control unit DXC waits for a time t1 whereat gates G11, G21 in the processor units PC1, PC2 are actuated and then makes the control signal (not labelled) inactive. Thus, first and second output gates 141,142 are both turned off. The output ends of first and second output gates 141,142 are detached physically thereafter from the lines, through which control permission signals IOCE1, IOCE2 are transmitted, according to the dismounting of the dual control unit DXC from the system.

Since control permission signal IOCE1 generated from processor unit PC1 is active, the dual control state is maintained during the foregoing series of operations.

Then, dual control unit DXC has its operation secured for the short time from the start of operation for detecting dismounting of the control unit DXC from the system, until it is detached from lines IOCE1, IOCE2.

Insertion of Dual Control Unit DXC into the System

In the state where dual control unit DXC is dismounted and processor unit PC1 is operating as the main system, if dual contro unit DXC is to be inserted into the system, signals IOCE1i, IOCE2i, DXRDYi and control signal (not labelled) from control part 14 are all inactive in the initial state, and the first to third output gates 141,142,143 all remain closed.

When dual control unit DXC is inserted completely into the system, insertion detection part 13 detects the state thereof and brings the state to the attention of control part 14. Upon receipt of the signal indicating the inserted state of the control, part 14 reads the current signal state of lines IOCE1, IOCE2 and sets the values to IOCE1i, IOCE2i. In this case, IOCE1i is made active, and IOCE2i is made inactive. Then, the control signal (unnmbered) is made active, and after a time t2 whereat the output gate opens, is secured, ready signal DXRDY is made active (FIG. 19, (c)).

When ready signal DXRRDY becomes active, gate G11 in processor unit PC1 closes. However, since an active level has already been generated to line IOCE1 by dual control unit DXC, the dual control state is maintained.

Then, pull-up resistances R1, R2 secure the line of IOCE1, IOCE2, which comes on the side where the output gate is closed, at a high level.

According to the above operation, special operations not reqquired. In the embodiment, when the unit's own ready signal is active, the IOCE line becomes active automatically. Thus, a single dual control unit is readily constructed without requiring special components.

Figure 20:
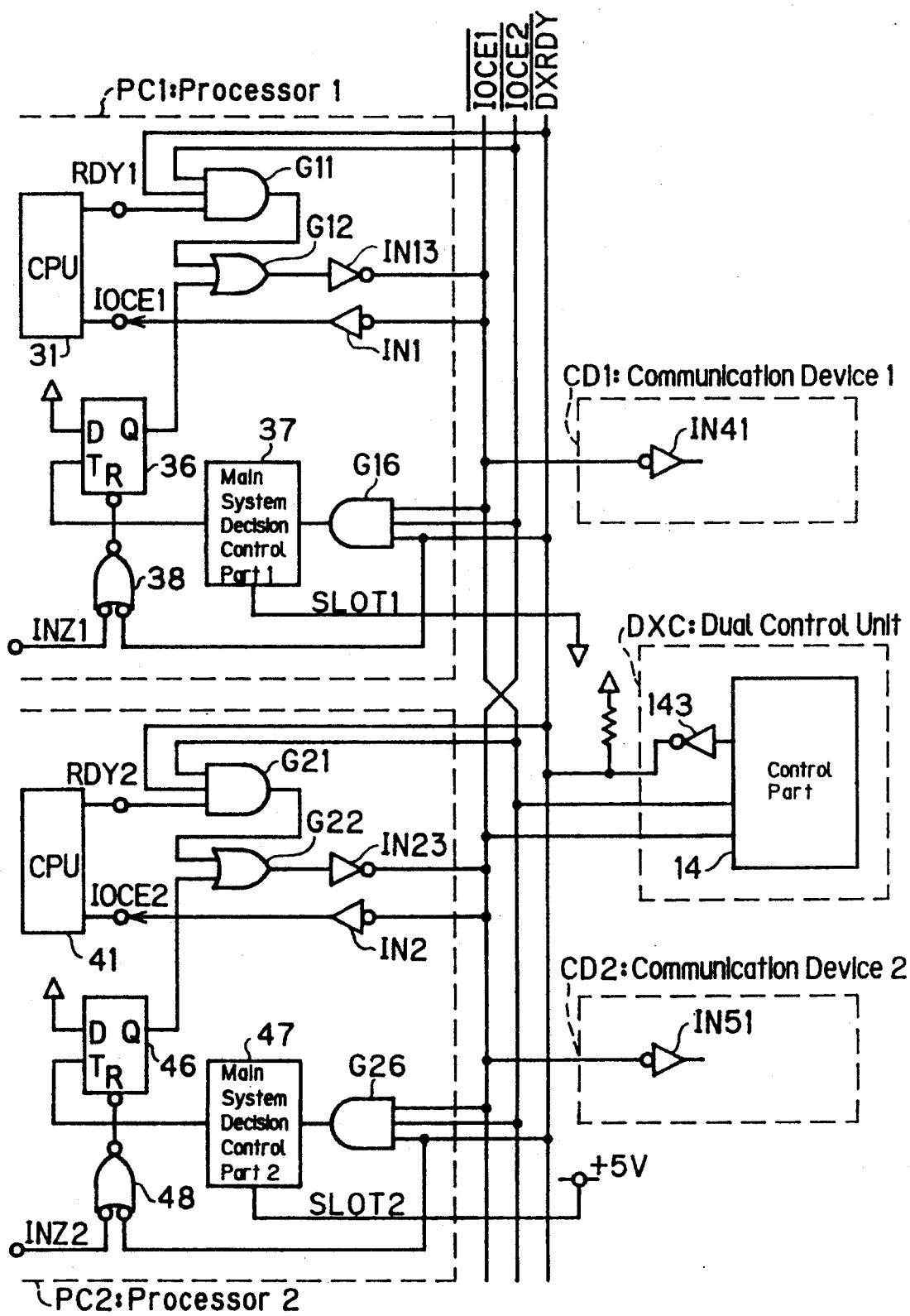
FIG. 20 is a block diagram depicting a further embodiment of the invention.

FIG. 20 depicts an embodiment, wherein operation of one unit is easily carried out, which the other processor unit is demounted therefrom. Dual control unit DXC generates control permission signals IOCE1, IOCE2 for actuating one of the processor units PCL, PC2, as a main stystem and the other as a subsidiary system, and normalcy/abnormality of dual control unit DSC from control part 14. While not particularly indicated, control part 14 has monitor means for monitoring operation of each processor unit, and for generating control permission signals IOCE1, IOCE2 and ready signal DXRDY according to the result obtained through monitoring.

Processor unit PC1 comprises an output gate G11 for receiving its own ready signal RDY1 and being active when its internal state is normal and control permission signal IOCE2 for deciding whether processor unit PC2 is to be the main system or subsidiary system; an OR gate G12 for receiving the output of output gate G11 as one input thereto; a driver IN13 for receiving a signal from OR gate G12 and having an output end thereof connected to line IOCE1 to which control permission signal IOCE1, used to decide whether the unit is to be the main system or the subsidiary system, is transmitted.

A flip-flop 36 is provided which is cleared, i.e. reset, by an initialization signal INZ1 at the time of power closing which is impressed through an AND gate 38, which also receives ready signal DXRDY from dual control unit DXC.

A main system decision control part 37 generates and applies a reset signal to reset flip-flop 36. The main system decision control part 37 receives a signal outputted from AND gate G16 which receives as inputs control permission signals IOCE1, IOCE2, and ready signal DXRDY, and also receives a packaging position signal, which is a low level signal, SLOT1 for identifying the position where the processor unit PC1 is packaged. When control permission signals IOCE1, IOCE2 and ready signal DXRDY are all inactive, and only when the packaging position signal SLOT1 coincides with a predetermined value, a lasting time of the state is measured by control part 37, and when the state lasts for a predetermined time, flip-flo 36 is set.

A receiver IN1 receives control permission signal IOCE1 when PC1 is the main system, and its output is provided to CPU 31 in processor unit PC1.

Processor unit PC2 comprises an output gate G21 for receiving as inputs its own ready signal RDY2, being active when its internal state is normal, and control permission signal IOCE1 for deciding whether processor unit PC1 is to be the main system or the subsidiary system; an OR gate G22 which recives an output from output gate G21 as one of its inputs; a driver IN23 which receives a signal from OR gate G22 as an input and has an output end thereof connected to line IOCE2 to which control permission signal IOCE2, which is used to decide which processor unit is to be the main system or subsidiary system, is transmitted.

A flip-flop 46 is provided, which is cleared, i.e. reset, by an initializing signal INZ2, at the time of power closing, which is impressed through an AND gate 48 which also receives ready signal DXRDY from dual control unit DXC.

A main system decision control part 47 is provided for outputting a signal to set flip-flop 46. The main system decision control part 47 receives a signal from AND gate G26, which receives as inputs control permission signals IOCE1, IOCE2, and ready signal DXRDY, and a packaging position signal, being a high level signal, SLOT2 for identifying a position where processor unit PC2 is packaged. With control permission signals IOCE1, IOCE2 and ready signal DXRDY being all inactive, and only when the packaging position signal SLOT2 coincides with a predetermined value, a lasting time of the state is measured by control part 47, and when the state lasts for a predetermined time, flip-flop 46 is set.

A receiver IN2 is provided for receiving control permission signal IOCE2 when processor unit PC2 is to be the main system, and for generating an output which is provided to CPU 41.

A communication device CD1 of processor unit PC1 is effective when control permission signal IOCE1 indicates that processor unit PC1 is to be the main system, and is capable of exchanging data with other systems. A receiver IN41 receives the control permission signal IOCE1.

A communication device CD2 of processor unit PC2 is effective when control permission signal IOCE2 indicates processor unit PC2 is to be the main system, and is capable of exchanging data with other systems. A receiver IN51 is provided for receiving control permission signal IOCE2.

Operation of the FIG. 20 system will now be described with reference to when dual control unit DXC is installed, and when dual control unit DXC is dismounted.

State When Dual Control Unit DXC is Installed

In this state, if each processor unit is operating normally, dual control unit DXC selects processor unit PC1 as a main system, and makes control permission signal IOCE1 active and control permission signal IOCE2 inactive. (Processor unit PC2 may be similarly selected as a main system). Then, ready signal DXRDY is made active.

With control permission signal IOCE being active, processor unit PC1 operates as the main system according to permission signal O1. With control permssion signal IOCE2 being inactive, processor unit PC2 operates as the subsidiary system.

When Dual Control Unit DXC is Dismounted (1) When data is loaded in the memory

When power is closed, flip-flops 36,46 in processor units PC1, PC2 are reset by internal initializing signals INZ1, INZ2. If the processor units, upon inspection, found normalcy of data bases in their own memories, then the ready signals RDY1, RDY2 in each processor unit are both made active. The self diagnosis insures otherwise normal operation.

AND gates G11, G21, OR gates G12, G22 and drivers IN13, IN23 form a flip-flop through signal lines of control permission signals IOCE1, IOCE2, and control permission signal IOCE on the processor side having made the ready signal active earlier becomes active.

For example, if ready signal RDY1 of processor unit PC1 was active earlier than ready signal RDY2 of processor unit PC2, then since control permission signals IOCE1, IOCE2 are both inactive, first, the output of gate G11 becomes high in level,the output of OR gate G12 is made high in level, and the output of driver IN13 is made low in level. Thus, when the control permission signal IOCE1 becomes active, and even if ready signal RDY2 of processor unit PC2 becomes active thereafter, gate G21 does not open and the output remains low in level, and control permission signal IOCE2 becomes inactive. The state lasts until ready signal RDY1 becomes inactive.

(2) When data base is not loaded in the memory

Where the data base is not loaded in the processor unit, ready signals RDY1, RDY2 are both not active. Consequently, control permission signals IOCE1, IOCE2 remain inactive first. However, if control permission signals IOCE1, IOCE2, and ready signal DXRDY are all inactive, e.g. in the state when ready signal DXRDY is inactive as dual control unit DXC is dismounted, outputs of AND gates G16, G26 become high in level, and the main system decision parts 37,47 measure the lasting time. Main system decision control parts 37,47 operate, for example, only at the time when the levels of the packaging position signals SLOT1, SLOT2 are low. In the embodiment, main system decision control part 37 of processor unit PC1 operates to measure the lasting time.

When a high level output of AND gate G16 lasts for a predetermined time, main system decision control part 37 sets flip-flop 36.

When flip-flop 36 is set, the output is impressed on driver IN13 through OR gate G12, and driver IN13 makes control permission signal IOCE1 active, i.e. to a low level.

According to the above operation, processor unit PC1 is operated as the main system, and the processor unit PC2 functions as the subsidiary system.

After control permission signal IOCE1 becomes active, communication unit CD1 is ready to respond to a communication from other systems. In this case, a necessary data base is ready for loading in the memory. Since control permission-signal IOCE2 is inactive, communication unit CD2 does not respond to a communication from other systems.

Figure 21:
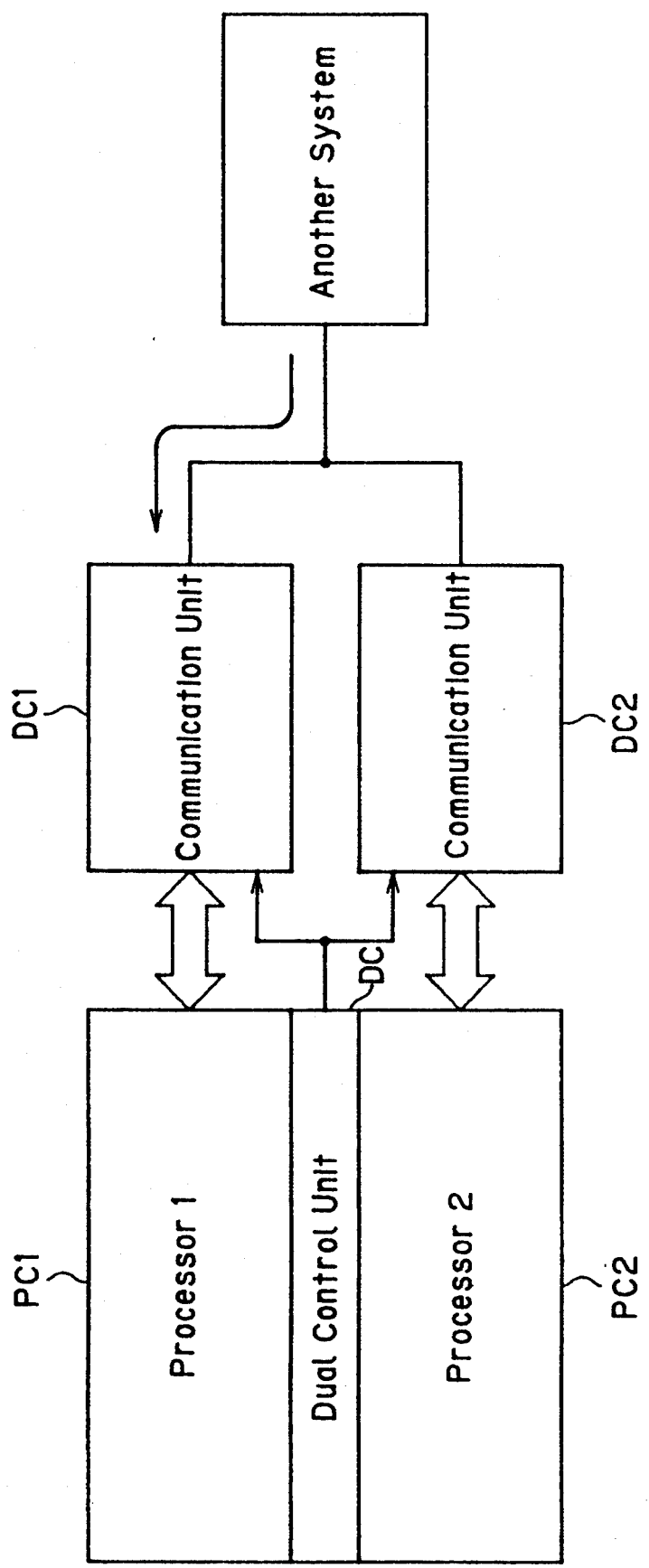
FIG. 21 is a block diagram depicting the operating state of the system of FIG. 20.

FIG. 21 depicts, by block diagram, the latter state, wherein data bases from other systems are loaded in the memory of processor unit PC1 thrugh the communication device DC1.

(3) Single system

In case, for example, processor unit PC2 is dismounted and only processor unit PC1 is present, control permission signal IOCE1 becomes active as in the case of (1) and (2) described above, and processor unit PC1 functions automatically as the main system. At the same time, communication unit CD1 coupled to processor unit PC1 is also ready for operation. Thus, a special switch is not required to decide which is to be the main system or the subsidiary system.

Then, the above description refers to the case where packaging position signal SLOT1 is set at a low level and SLOT2 is set at a high level, and main system decision control parts 37,47 measure the lasting time when the packaging position signals coincide with a predetermined value. However, a priority control system may also be used so that the levels of the packaging position signals SLOT1, SLOT2 are provided at values corresponding to the priority level, the main system decision control parts 37,47 measure th lasting time as long as it corresponds to the levels of the packaging position signals, thus, actuating the processor unit with the higher priority first, as the main system.

Figure 22:
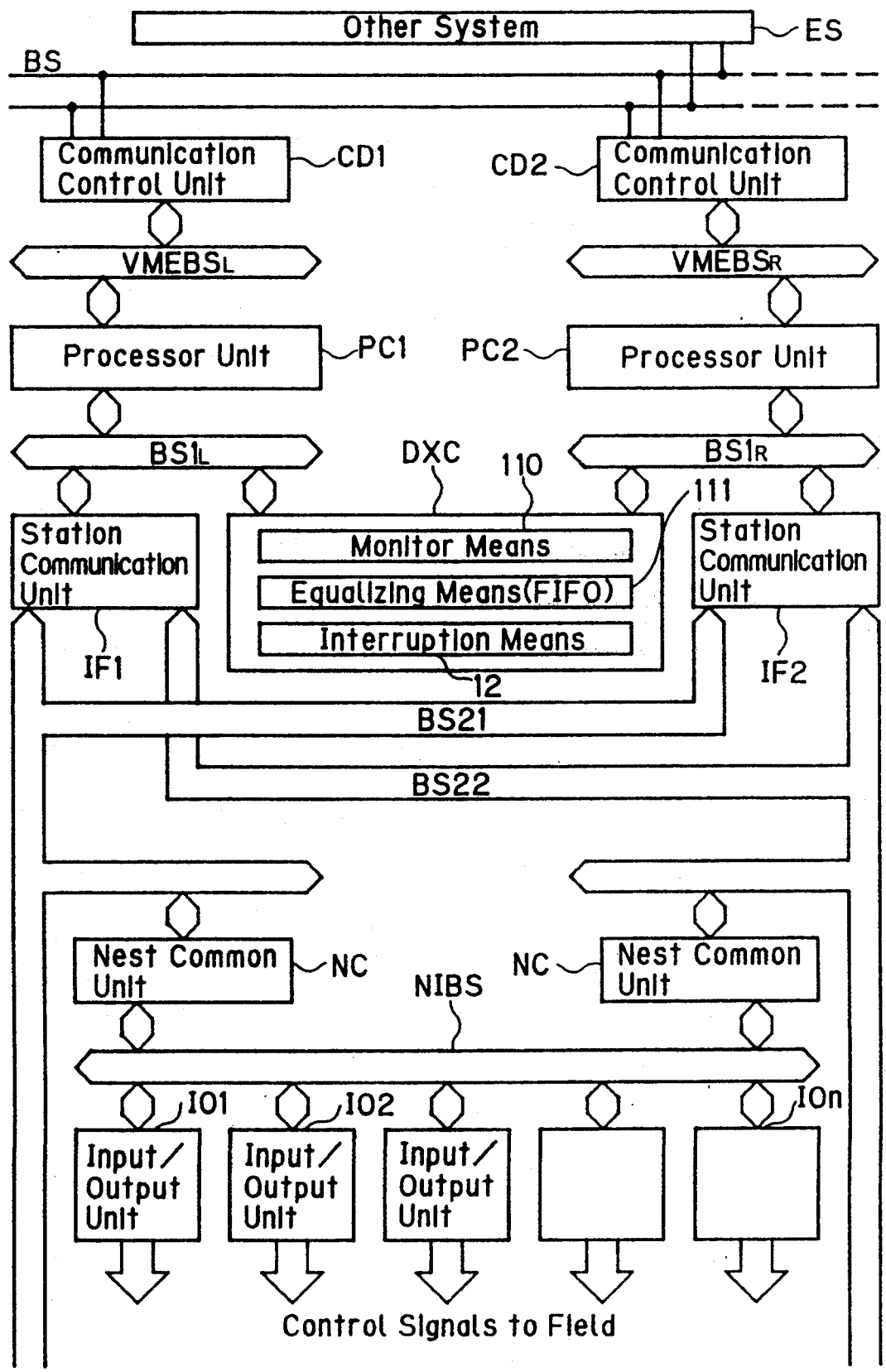
FIG. 22 is a block diagram depicting one example of the general construction of the system of the invention.

FIG. 22 shows such a system wherein the two processor units PC1, PC2 are connected to other system ES via buses VMEDBL and VMEBSR, communication control units DC1, CD2, and communication bus BS. HF bus conforming to PROWAY is used as the communication bus BS. Communication control units CD1, CD2, each functions as an interface with the HF bus BS, and are each provided internally With functions to retain trace information of a communication frame at the time of communication error generation and maintenance information such as repetition, frequency at each error content and others.

Station communication units IF1, IF2 function as an interface with buses BS21, BS22, including the same functional portions as the interface parts in FIG. 17.

The input/output units $IO_1 \ldots IO_n$ are accessed from processor units PC1, PC2 by way of bus BS1, infrastation communication unit IF1,IF2, bus BS21, BS22, nest common unit NC, and bus NIBS.

Nest common units NC are bus repeaters, each provided between upper buses BS21, BS22 and a lower bus NIBS connecting with input/output units $IO_1 \ldots IO_n$. The internal construction of nest common units NC is as shown in FIG. 23.

In FIG. 23 comparison means 23 is provided for comparing signals, e.g. data, address,ere, on upper bus BS2 and signals on lower bus NIBS. A handshake means 72 exchanges signals on upper bus BS2 and signals on lower bus NIBS. A flip-flop 73 receives a mismatch signal from comparison means 71, is set on a timing of signals generated from handshake means 72 and applied through lead wire $L_1$, and also is reset by a reset signal transmitted from processor unit PC throu a lead wire $L_3$.

A buffer 74 transmits a bus error signal generated by flip-flop 73, and read means 75 reads the contents of flip-flop 73 through upper bus BS2, which is provided within processor units PC1, PC2.

The bus error signal generated by flip-flo 73 is also applied to handshake means 72 through a lead wire $L_2$ to control the handshake operation.

FIG. 24 shows operation of the FIG. 22, 23 embodiments and indicates signals on lower bus NIBS when the bus error is not detected. An address signal Ads for selecting a specified one of the plurality of input/output units IO is generated by processor unit as shown in line (a). Comparison means 71 compares the address signals on both buses BS2, NIBS at first, and the results thereof are sampled at a timing shown in line (e). When a bus error is detected as a result of the comparison, a mismatch signal is applied to flip-flop 73.

Upon receipt of the signal, flip-flop 73 is set at a timing of signal from handshake means 72, and a bus error signal is generated at its output end. The bus error signal is applied to handshake means 72 to suppress its handshake operation. Thus, a bus sequence is kept from going any further thereafter. That is, while not so indicated, a strobe signal of the address signal will not be applied to lower bus NIBS.

When a bus error is not detected, a response is transmitted to the processor unit PC on an upper side, as shown in line (b), from the input/output unit IO present on a lower side of the address.

However, where a bus error is detected, since a strobe signal of the address signal is not generated, the response is not returned, and no response is effected to the upper side processor unit PC. Upon receipt of the no-response, processor unit PC reads the contents of buffer 74 through bus BS2, thereby recognizing that the no-response is a bus error on the lower side bus NIBS or an error of the nest common unit NC. Then, no error arises on the address or data on the upper side bus BS2.

When a bus error is not detected after sending the address as shown in line (a), the processor unit PC receives a response as shown in line (b).

Upon receipt of the response, a write data is then sent to the corresponding input/out unit IO in write operation as shown in line (c). The write data is also compared by comparison, means 71, and the results thereof are provided to flip-flop 73 at the timing shown in line (f).

If the operating state is normal, then a strobe signal of the write data is sent to the lower side bus NIBS, and a response signal is returned from the input/output unit IO having received the data as shown in line (e).

Where the comparison result indicates a mismatch, the strobe signal is not returned to the lower side, and thus, the response signal is not returned, Thus, no response is effected to the upper side.

Then, a read data from the corresponding input/output unit IO is read out, as shown in line (d), and when a bus error is not detected, it is transmitted to the upper side processor unit PC through buses BS2, NIBS.

When an error is detected, the response signal (e) from the input/output unit IO is not transmitted to the upper side, and the upper side processor unit PC detects no response.

Then, the above description refers to the case where the flip-flop is set on an error signal of a plurality of bits consitituting the bus. However, if the flip-flop is provided plurally according to each bit, and the state of each flip-flop is retained by buffer means, then the error can be recognized accurately with reference to each bit.

The foregoing description is illustrative of the principles of the invention. Numerous modifications and extensions thereof would be apparent to the worker skilled in the art. All such modifications and extensions are to be considered to be within the spirit and scope of the invention.

What is claimed is:

1. In a dual computer system comprising a left processor unit, and a right processor unit, one of said left and right processor units being operated as a main system while the other is kept on standby as a subsidiary system against the failure of the main system, each of said left and right processor units comprising a memory and a dual control unit for controlling which one of said left and right processor units is to be operated as the main system according to information obtained through the monitoring of the operating states of said left and right processor units; wherein said left processor unit further comprising means for generating a signal $WRI_L$ to cause data in said memory of said left processor unit to be written into a first-in-first-out memory of an equalizing means according to a write operation when said left processor unit is in operation, and to cause data stored in said first-in-first-out memory to be read out and shifted to said left processor unit when said left processor unit is on standby;

said right processor unit further comprising means for generating a signal $WRI_R$ to cause data in said memory of said right processor unit to be written into said first-in-first-out memory according to a write operation when said right processor unit is in operation, and to cause data stored in said first-in-first-out memory to be read out and shifted to said right processor unit when said right processor unit is on standby;

said left processor unit further comprising means for generating a control declaration signal $CTL_L$ when said left processor unit is to be in operation;

said right processor unit further comprising means for generating a control declaration signal $CTL_R$ when said right processor unit is to be in operation;

means for generating a dual control signal $DCS_L$ to cause said left processor unit to be operated;

means for generating a dual control signal $DCS_R$ to cause said right processor unit to be operated;

said dual control means comprises said equalizing means for continuously equalizing the contents of said memory in each of said left and right processor units, said equalizing means comprising said first-in-first-out memory;

means for controlling the shift-in SI of data to said first-in-first-out memory only when the following expression is satisfied:

$$SI = ACC_L \cdot WRI_L \cdot CTL_L \cdot DCS_L + ACC_R \cdot WRI_R \cdot CTL_R \cdot DCS_R;$$

means for controlling the shift out SO of data from said first-in-first-out memory only when the following expression is satisfied:

$$SO = ACC_L \cdot WRI_L \cdot CTL_L + ACC_R \cdot WRI_R \cdot CTL_R$$

wherein $ACC_L$ (or $ACC_R$) is a signal which becomes active in case of write-access or read-access from the left (or right) side processor unit to said first-in-first-out memory; and means for monitoring the operational states of each of said left and right processor units and in response thereto for inhibiting access to said first-in-first-out memory when it is found that the above two expressions are not satisfied so that data is protected from undesired loss and continuity of control is maintained at all times including the time that transfer of control between the left and right processor units occurs.

2. The system of claim 1, wherein said dual control unit comprises two independent interruption means for indicating switching of said two processor units to the main system and to the subsidiary system;

a processor for generating an interrupt signal; and an internal bus; wherein said two interruption means receive said interrupt signal from said processor through said internal bus, retain said interrupt signal according to a dual switching signal, and perform interruption for selective switching of said two processor units.

3. The system of claim 1, wherein said dual control unit further comprises interruption control means for generating interrupt signals $FINT_L$, $FINT_R$ indicating interruption for a hierarchy of data reading priority to the two processor units according to the below expressions:

$$FINT_L = ACC_R \cdot SI \cdot HFUL \cdot IF_L + ACC_L \cdot FIN_L + IRST \cdot FIN_L$$

$$FIN_L = FINT_L$$

$$FINT_R = ACC_L \cdot SI \cdot HFUL \cdot IF_R + ACC_R \cdot FIN_R + IRST \cdot FIN_R$$

$$FIN_R = FINT_R$$

$$IF_L = (FIN_L \cdot IF_L + SO \cdot ACC_L \cdot EMPY)$$

$$IF_R = (FIN_R \cdot IF_R + SO \cdot ACC_R \cdot EMPY)$$

wherein, ACC denotes an access signal to the interruption control means; subscript L indicates signals from the left processor unit and R indicates signals from the right processor unit; SO denotes a shift-out signal from the first-in-first-out memory; SI denotes a shift-in signal from the first-in-first-out memory; HFUL denotes a half full signal generated when half of the data of the volume is loaded in the first-in-first-out memory; EMPY denotes an empty signal generated when the first-in-first-out memory becomes empty; $FINT_L$ denotes an interrupt signal provided to the left processor unit; $FINT_R$ denotes an interrupt signal provided to the right processor unit; IRST denotes a reset signal of the interrupt signals $FINT_L$, $FINT_R$ provided from the left or right processor unit when the access signal is asserted.

4. The system of claim 1, wherein said two processor units comprise
- mark insertion means for inserting a start mark and an end mark in each of said two processor units at points in time whereat actual operation of said each processor unit starts and ends;
- end mark detection means for detecting the end mark from within data read out from said first-in-first-out memory; and
- data loading means for loading data from said start mark to said end mark in an address when said end mark is detected; wherein
- a control signal for determining which processor unit is operated is transferred from data in which said start mark is inserted to a selected processor unit to start operation thereof.

5. The system of claim 1, further comprising
- two supply means for feeding an operating power to each of said two processor units;
- an input/output unit controlled by said two processor units;
- a first bus connecting said two processor units and transmitting data for equalizing data bases mutually;
- a second bus connecting each of said two processor units and said input/output unit for exchanging data with each other; and
- wherein said two processor units each comprises bus function stop means for stopping at least the data transmission function of said first bus at time of ON and OFF operations of corresponding supply means and in an output voltage transient state.

6. The system of claim 5, wherein said bus function stop means comprises an open collector gate to which are applied a bus control signal and a signal coming to high level when a power voltage of one or more of said two supply means reaches an operable voltage.

7. The system of claim 1, further comprising
- an input/output unit connected to said two processor units through an input/output bus;
- means for providing a ready signal flag for indicating normalcy of operation thereof;
- means for providing a capability signal flag indicating capability of being in operation; and
- arithmetic operation output means for receiving a ready signal flag and a capability signal flag from said respective two means for providing, computing a logical product of both said signal flags, and transferring said operation output signal to said input/output unit;
- said input/output unit deciding whether or not it is accessed according to said operation output signal from said arithmetic operation output means.

8. The system of claim 1, further comprising
- a first bus connecting the dual control unit and each of said two processor units and transmitting data for equalizing a data base mutually;
- a second bus connecting with said first bus through an intrastation communication unit functioning as an interface;
- a plurality of input/output units;
- a third bus; and
- a nest common unit functioning as a bus repeater provided against said third bus to which said second bus and said plurality of input/output units are connected;
- wherein said nest common unit comprises
  - comparison means for comparing a signal on said second bus and a signal on said third bus and for providing a mismatch signal when a mismatch is determined;
  - handshake means for exchanging a signal on said second bus and a signal on said third bus;
  - a flip-flop set on said mismatch signal from said comparison means;
  - a buffer for transmitting a signal from said flip-flop; and
  - said two processor units reading the contents of said flip-flop through said second bus by way of said buffer.

* * * * *